US012809818B2

(12) United States Patent
Jana et al.

(10) Patent No.: US 12,809,818 B2
(45) Date of Patent: Nov. 24, 2026

(54) MULTI-WAY MERGER OF COMPUTING SNAPSHOTS

(71) Applicant: Rubrik, Inc., Palo Alto, CA (US)

(72) Inventors: Sayantan Jana, Palo Alto, CA (US); Shubham Tagra, Bengaluru (IN); Harmandeep Singh, Bengaluru (IN); Jaya Jyothiswaroop Kotni, Bengaluru (IN); Nitin Patil, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/022,136

(22) Filed: Jan. 15, 2025

(65) Prior Publication Data

US 2026/0203254 A1 Jul. 16, 2026

(51) Int. Cl.
*G06F 16/11* (2019.01)
*G06F 16/174* (2019.01)
*G06F 16/182* (2019.01)

(52) U.S. Cl.
CPC ........ *G06F 16/128* (2019.01); *G06F 16/1748* (2019.01); *G06F 16/1824* (2019.01)

(58) Field of Classification Search
CPC . G06F 16/128; G06F 16/1824; G06F 16/1748
USPC .......................................................... 707/649
See application file for complete search history.

(56) References Cited

U.S. PATENT DOCUMENTS 8,260,752 B1 * 9/2012 Stringham .......... G06F 11/1451 707/649
8,429,360 B1 * 4/2013 Iyer ...................... G06F 16/275 718/1
8,738,883 B2 * 5/2014 Wade .................. G06F 11/1471 718/1
8,745,003 B1 * 6/2014 Patterson ............ G06F 11/1471 707/639
8,782,003 B1 * 7/2014 Patterson ............ G06F 16/1734 707/624
9,823,973 B1 * 11/2017 Natanzon ............ G06F 11/1438
9,852,140 B1 * 12/2017 Li ........................ G06F 16/1734
10,761,941 B1 * 9/2020 Redko ................. G06F 11/1451
2005/0182910 A1 * 8/2005 Stager ................. G06F 11/1456 711/159

(Continued)

FOREIGN PATENT DOCUMENTS

CN 103019888 A * 4/2013
WO WO-2021062248 A1 * 4/2021 .......... G06F 11/1469
WO WO-2025161519 A1 * 8/2025 ........... G06F 16/148

*Primary Examiner* — Phuong Thao Cao
(74) *Attorney, Agent, or Firm* — Holland & Hart LLP

(57) ABSTRACT

Methods, systems, and devices for data management are described. A data management system (DMS) may obtain a first list of one or more first data blocks associated with one or more differences between a first snapshot stored at a first block-based storage environment and a second snapshot stored at the first block-based storage environment. The DMS may obtain a second list of one or more second data blocks associated with one or more differences between a third snapshot stored at a second block-based storage environment and a fourth snapshot stored at the second block-based storage environment. The DMS may merge the first list of one or more first data blocks and the second list of one or more second data blocks to obtain a merged list of one or more third data blocks. The DMS may generate a fifth snapshot based on the merged list.

20 Claims, 10 Drawing Sheets

(56) References Cited

U.S. PATENT DOCUMENTS

| | | | | |
|---|---|---|---|---|
| 2014/0317369 | A1* | 10/2014 | Wade | G06F 11/1471<br>711/162 |
| 2015/0310080 | A1* | 10/2015 | Jaquette | G06F 16/1756<br>707/639 |
| 2019/0012238 | A1* | 1/2019 | Butterworth | G06F 11/1451 |
| 2020/0104202 | A1* | 4/2020 | Stupak | G06F 11/1451 |
| 2021/0096958 | A1* | 4/2021 | Kumar | G06F 11/1004 |
| 2021/0096961 | A1* | 4/2021 | Kumar | G06F 3/064 |
| 2021/0109814 | A1* | 4/2021 | Dewey | G06F 3/067 |
| 2021/0406132 | A1* | 12/2021 | Gupta | G06F 11/1451 |
| 2023/0409206 | A1* | 12/2023 | Kuchibhotla | G06F 3/061 |
| 2024/0184745 | A1* | 6/2024 | Gathala | G06F 11/1451 |

* cited by examiner

MULTI-WAY MERGER OF COMPUTING SNAPSHOTS

FIELD OF TECHNOLOGY

The present disclosure relates generally to data management, including techniques for multi-way merger of computing snapshots.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
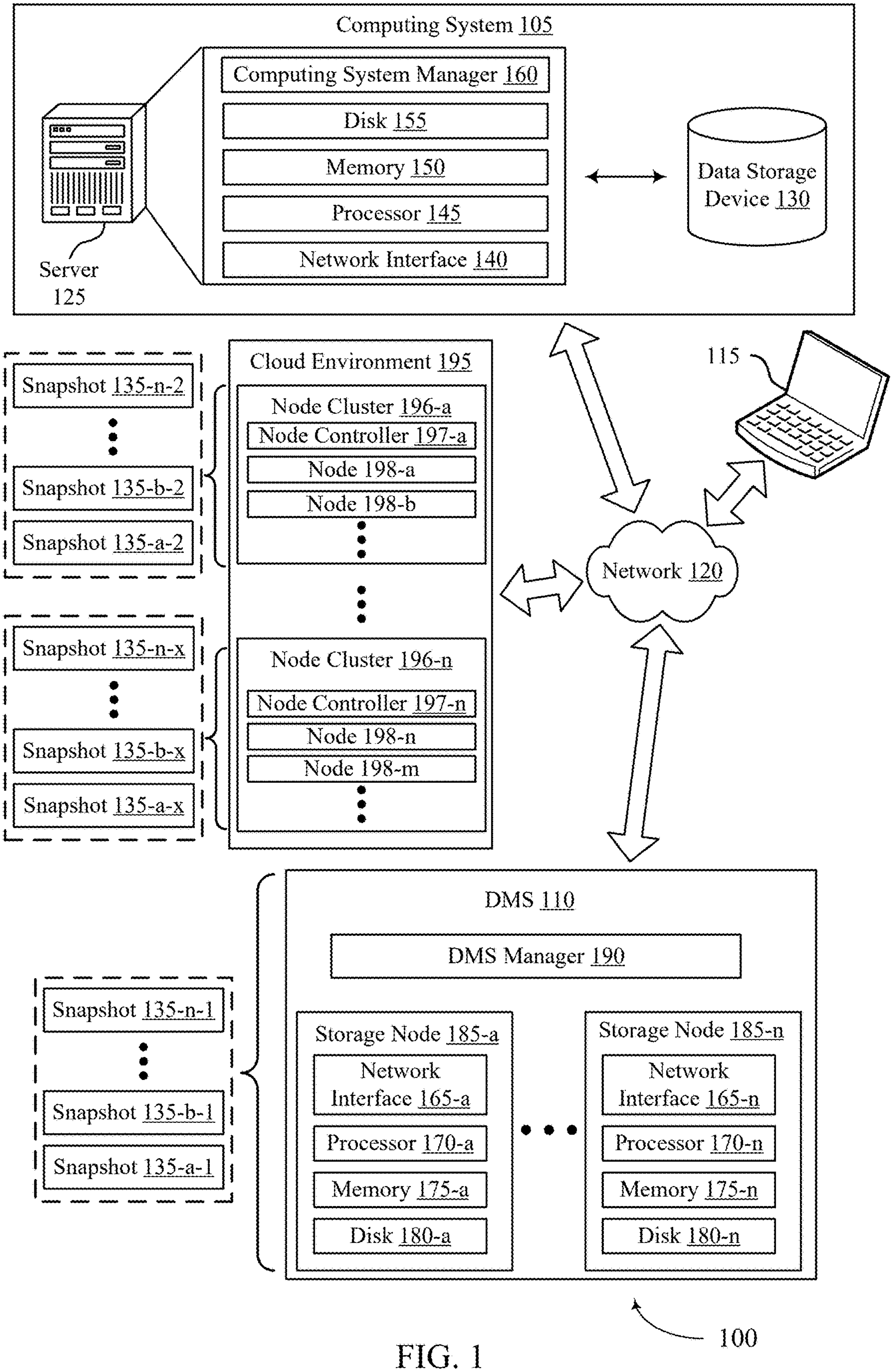
FIG. 1 illustrates an example of a computing environment that supports multi-way merger of computing snapshots in accordance with aspects of the present disclosure.

A data management system (DMS) may communicate with multiple block-based storage environments to provide backup and recovery services for a computing object. For example, the DMS may coordinate with a first storage environment (e.g., a cloud environment and a second storage environment (e.g., an archival environment) to store snapshots of the computing object. The first storage environment may be associated with higher performance (e.g., lower latency) but higher operating costs than the second storage environment. Thus, although the DMS may store snapshots of the computing object initially in the first storage environment, over time, the DMS may replicate snapshots from the first storage environment to the second storage environment and delete (e.g., cull) the replicated snapshots from the first storage environment (e.g., in accordance with an archival policy). Snapshots in the second storage environment may in some cases be referred to as archival snapshots (e.g., secondary snapshots), and snapshots in the first storage environment may in some cases be referred to as source snapshots (e.g., primary snapshots).

In some cases, it may be beneficial to have an incremental snapshot in the second storage environment that represents changes to a computing object relative to an earlier snapshot that is not an immediately prior snapshot. This may, for example, reduce the latency of a restore operation for the point in time corresponding to the incremental snapshot by reducing the length of an associated snapshot chain used for the restore operation, among other potential benefits. The incremental structure may be referred to as tree-based snapshot management (e.g., as opposed to linear snapshot management in which each incremental snapshot of a computing object is relative to an immediately most recent prior snapshot). In some scenarios (e.g., if linear snapshot management is used in the first storage environment), it may be desirable to create an incremental snapshot in the second storage environment that represents changes to the computing object relative to a prior secondary snapshot for which a corresponding primary snapshot has been deleted (e.g., culled) from the first storage environment. In such cases, the first storage environment may not be able to provide, to the DMS, an indication of the changed data blocks as between the earlier source snapshot that has been deleted and the later source snapshot corresponding to a same state of the computing object as the to-be-created archival snapshot.

In accordance with techniques described herein, the DMS may merge multiple snapshots, including where the snapshots are distributed across multiple storage environments (e.g., across the first storage environment and the second storage environment). For example, the DMS may generate, within a second storage environment, an incremental snapshot representing changes to a computing object relative to an earlier point in time that corresponds to a snapshot that was previously deleted from the first storage environment. The DMS may obtain (e.g., from the first storage environment) a first list of one or more first data blocks indicative of one or more differences between a later source snapshot and an earlier source snapshot in the first storage environment, where the later source snapshot corresponds to a same point in time as the incremental snapshot that is to be generated in the second storage environment. The earlier source snapshot may, for example, be an immediately prior snapshot relative to the later primary snapshot. The DMS may obtain a second list of one or more second data blocks indicative of one or more differences between two archival snapshots, where the later of the two archival snapshots corresponds to the earlier source snapshot, and where the earlier of the two archival snapshots corresponds to the same earlier point in time as the snapshot that was previously deleted from the first storage environment. For example, the DMS may obtain the second list of one or more second data blocks based on a comparison of fingerprints (e.g., hashes) of data blocks corresponding to the two archival snapshots. The DMS may merge the first list of data blocks and the second list of data blocks to obtain a merged list of changed data blocks, and the DMS may use the merged list of changed data blocks to generate the incremental snapshot within the second storage environment that represents changes to the computing object relative to the earlier point in time (e.g., for which a corresponding source snapshot was previously deleted from the first storage environment).

FIG. 1 illustrates an example of a computing environment 100 that supports multi-way merger of computing snapshots in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (Saas) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

According to techniques described herein, the DMS 110 may merge multiple snapshots 135, including where the snapshots 135 are distributed across multiple storage environments (e.g., across a first storage environment and a second storage environment). Th multiple storage environments may be an example of a cloud environment 195 or a storage node 185. For example, the DMS 110 may generate, within a second storage environment, an incremental snapshot 135 representing changes to a computing object relative to an earlier point in time that corresponds to a snapshot 135 that was previously deleted from the first storage environment. The DMS 110 may obtain (e.g., from the first storage environment) a first list of one or more first data blocks indicative of one or more differences between a later source snapshot 135 and an earlier source snapshot 135 in the first storage environment, where the later source snapshot 135 corresponds to a same point in time as the incremental snapshot 135 that is to be generated in the second storage environment. The earlier source snapshot 135 may, for example, be an immediately prior snapshot 135 relative to the later primary snapshot 135. The DMS 110 may obtain a second list of one or more second data blocks indicative of one or more differences between two archival snapshots 135, where the later of the two archival snapshots 135 corresponds to the earlier source snapshot 135, and where the earlier of the two archival snapshots 135 corresponds to the same earlier point in time as the snapshot 135 that was previously deleted from the first storage environment. For example, the DMS 110 may obtain the second list of one or more second data blocks based on a comparison of fingerprints (e.g., hashes) of data blocks corresponding to the two archival snapshots 135. The DMS 110 may merge the first list of data blocks and the second list of data blocks to obtain a merged list of changed data blocks, and the DMS 110 may use the merged list of changed data blocks to generate the incremental snapshot 135 within the second storage environment that represents changes to the computing object relative to the earlier point in time (e.g., for which a corresponding source snapshot 135 was previously deleted from the first storage environment).

Figure 2:
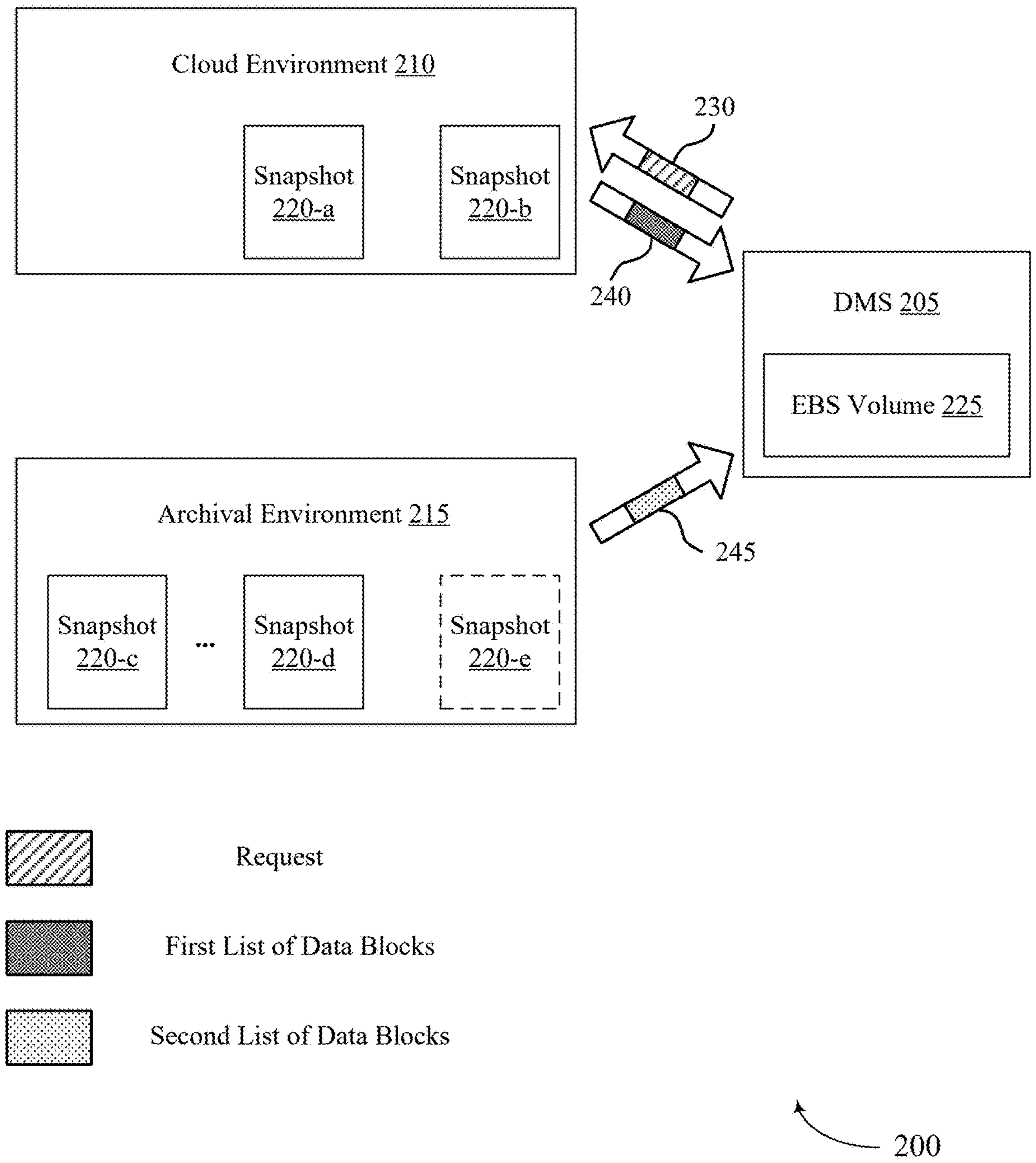
FIG. 2 shows an example of a system diagram that supports multi-way merger of computing snapshots in accordance with aspects of the present disclosure.

FIG. 2 shows an example of a system diagram 200 that supports multi-way merger of computing snapshots in accordance with aspects of the present disclosure. The system diagram 200 may implement or be implemented by aspects of the computing environment 100 described with reference to FIG. 1. For example, the system diagram 200 may include a DMS 205, which may be an example of a DMS 110 as described with reference to FIG. 1. The system diagram 200 may also include a cloud environment 210 (e.g., a first block-based storage environment) and an archival environment (e.g., a second block-based storage environment), which may be examples of a cloud environment 195 or a storage node 185. The DMS 205 may communicate with the cloud environment 210 and the archival environment 215 to store and manage multiple snapshots 220 representative of a computer object at various points in time. The snapshots 220 may be an example of the snapshots 135 as described with reference to FIG. 1. Although examples are described herein with respect to a cloud environment 210 and an archival environment 215, it is to be understood that the teachings herein may be applicable to any two storage environments, including other types of block-based storage environments that may or may not be cloud-based or archival in nature.

In some examples, the cloud environment 210 may store snapshots 220 in a linear snapshot management structure. For example, the snapshot 220-*a* may be an example of a base snapshot or a full image snapshot. Subsequent snapshots 220 may be incremental snapshots and may include data blocks that have changed relative to an immediately most recent snapshot 220. For example, the snapshot 220-*b* may be an incremental snapshot dependent on the base snapshot 220-*a* (e.g., an immediately prior snapshot 220). In some examples, the archival environment 215 may store snapshots 220 in a tree-based snapshot management structure. For example, the snapshot 220-*a* may be an example of a base snapshot or a full image snapshot. Subsequent snapshots 220 may be incremental snapshots and include data blocks that have changed relative to any prior snapshot 220. For example, a snapshot 220-*e* may be dependent on the base snapshot 220-*c* or an immediately prior snapshot 220-*d*.

The DMS 205 may communicate with the cloud environment 210 and the archival environment 215 to provide backup and recovery services for a computing object. The DMS 205 may generate and store snapshots 220 on the cloud environment 210. The cloud environment 210 may be associated with higher performance (e.g., lower latency) but higher operating costs than the archival environment 215. Thus, although the DMS 205 may store snapshots 220 of the computing object initially in the cloud environment 210, over time, the DMS 205 may replicate snapshots 220 from the cloud environment 210 to the archival environment 215 and delete (e.g., cull) the replicated snapshots from the cloud environment.

For example, the DMS 205 may include a capability to move snapshots 220 from storage provided by the cloud environment 210 (e.g., EBS snapshots) to the archival environment 215. The DMS 205 may include an ability to recover (e.g., export, restore, or perform file downloads) the computing object from snapshots 220 present in the archival environment 215. Moving snapshots 220 from the cloud environment 210 to the archival environment 215 may reduce operating costs (e.g., based on the cloud environment 210 being associated with higher costs). For example, the cloud environment 210 may be an example of one or more EBS snapshots which may be twice as expensive as the archival environment 215 (e.g., Amazon S3 storage).

As described herein, source snapshots 220 may be snapshots 220 on the cloud environment (e.g., primary storage). For example, the source snapshots 220 may exist on a cloud vendor sites. The source snapshots may be associated with higher operating costs and faster recovery times. For example, the source snapshots may be stored on EBS snapshot storage for amazon web services (AWS) snappable snapshots. Archival snapshots 220 may be snapshots 220 on the archival environment 215 (e.g., secondary storage). The archival snapshots may be stored on the archival environment 215 to provide storage for the snapshots 220 for a longer periods of time. The archival snapshots 220 may be associated with lower operating costs and slower recover times. For example, the archival snapshots 220 may be stored in an S3 bucket for AWS snappable snapshots or Amazon S3 Glacier.

For example, in an archival workflow for a cloud native backups, the cloud environment 210 may include one or more source snapshots 220 (e.g., a base source snapshot 220-*a*), and the archival environment 215 may include one or more archival snapshots 220 (e.g., a base archival snapshot 220-*c* and a previous archival snapshot 220-*d*). The source snapshot 220-*a* and the archival snapshot 220-*d* may be representative of the computing object at the same point in time. A previous source snapshot 220 and the archival snapshot 220-*c* may be representative of the computing object at the same point in time. However, the previous source snapshot 220 may be previously removed from the cloud environment 210 to reduce operating costs.

The DMS 205 may generate a new source snapshot 220-*b* and store the new source snapshot 220-*b* on the cloud environment 210. It may be beneficial to archive the new source snapshot 220-*b* (e.g., generate a new archival snapshot 220-*e* to provide long term storage for the new source snapshot 220-*b* after the new source snapshot 220-*b* is removed from the cloud environment 210). The cloud environment 210 may retain a previous source snapshot 220 that was archived last to provide incremental archival and faster restore times. For example, the base source snapshot 220-*a* may be the previous source snapshot 220 generated before the new source snapshot 220-*b*. To archive the new source snapshot 220, the DMS 205 may output a request 230 for a first list of data blocks 240. For example, the DMS 205 output a list changed blocks application program interface (API) call (e.g., ListChangedBlocks feature) provided by the cloud environment 210 on the base source snapshot 220-*a* and the new source snapshot 220-*b*. The cloud environment 210 may provide a first list of data blocks 240 including one or more data blocks that have changed between the base source snapshot 220-*a* and the new source snapshot 220-*b*. The DMS 205 may utilize the first list of data blocks 240 to realize the data to be read and written to generate the archival snapshot 220-*e*.

The DMS 205 may write an incremental snapshot file in a chain based snapshot management. In chain based incremental snapshot management, contents of a source base snapshot (e.g., the base source snapshot 220-*a*) and a previous archival snapshot 220-*d* may be the same. For example, the base source snapshot 220-*a* and the previous archival snapshot 220-*d* may include the same content based on the source snapshot 220-*a* and the previous snapshot 220-*d* being representative of the computing object at the same point in time. The DMS 205 may use the list changed blocks API call (e.g., ListChangedBlock) on the base source snapshot 220-*a* and the new source snapshot 220-*b* to get a list of the data blocks that have changed between the source snapshots 220. If the new archival snapshot 220-*e* is an incremental dependent on the previous archival snapshot 220-*d*, the list of data blocks that have changed between the source snapshots 220 may also be the list of data blocks that have changed between the archival snapshots 220.

In some examples, the DMS 205 may mount the source snapshot 220-*b* on the EBS volume 225. For example, the DMS 205 may attach the source snapshot 220-*b* to an exocompute node. Although the source snapshot 220-*b* may be an incremental snapshot, the DMS 205 may mount all data blocks over the source snapshot 220-*a* and the source snapshot 220-*b*. For example, the DMS 205 may mount a full view of the snappable. In some examples, the DMS 205 may read data from the source snapshot 220-*b* via a disk read API call (e.g., based on the cloud vendor providing a disk read API).

The DMS 205 may create the archival snapshot 220-*e* (e.g., a patch file). For example, the DMS 205 may read selective blocks (e.g., the data blocks indicated by the first list of data blocks 240). The DMS 205 may read the selective blocks in a block size supported by the cloud environment 210 (e.g., 512 kilobytes (KB) or 4 megabytes (MB)). A patch file builder (e.g., a patchFileBuilder) or file creator service may realize which selective blocks (e.g., 64 KB blocks supported by the cloud environment) are to be written for the new archival snapshot 220-*e* (e.g., incremental file). The DMS 205 may generate the new archival snapshot 220-*e* based on the selective blocks, and the DMS 205 may output (e.g., write) the new archival snapshot 220-*e* to the archival environment 215.

The DMS 205 may generate the new archival snapshot 220-*e* as long as the snapshot chain order being formed on archival environment 215 matches the snapshot order being formed on the cloud environment 210 (e.g., the archival snapshot 220-*e* may be an incremental snapshot on top of the last archival snapshot 220, such as the snapshot 220-*a*).

In some examples, the new archival snapshot 220-*e* may be an incremental snapshot on top of a differential snapshot 220 for which the source snapshot 220 may have been deleted from the cloud environment 210. The DMS 205 may be unable to access the data for the deleted source snapshot 220 and use the list changed blocks API call feature on the deleted source snapshot 220 and the new source snapshot 220-*b*. In such cases, it may be beneficial for the DMS 205 to determine which data blocks have changed between the deleted source snapshot 220 and the new source snapshot 220-*b* to generate the new archival snapshot 220-*e*. In some examples, the cloud environment 210 may keep on storing source snapshots 220 for a longer duration. For example, the cloud environment 210 may retain the deleted snapshot 220 for a longer period of time. However, storing source snapshots for a longer period of time may incur higher storage costs. In some other examples, the DMS may read the new source snapshot 220 as a full snapshot 220 from the cloud environment 210, and the DMS 205 may write an incremental snapshot 220 (e.g., incremental file), and rely on the patch file builder to handle the deduplication between the full snapshot 220 and the archival snapshots 220. However, reading the full volume of data (e.g., the full snapshot 220) may increase processing times leading to higher compute (e.g., exocompute) times incurring high operating times. Or, in some other examples, the cloud environment 210 may keep on storing source snapshots 220 until they could be used as a potential base as per the base selection heuristic. However, the increased source snapshots may increase operating costs compared to techniques described herein. Thus, it may be beneficial for the DMS to generate an incremental snapshot (e.g., the archival snapshot 220-*e*) depending on a full snapshot 220 no longer stored on the cloud environment 210 without increase the quantity of snapshots stored on the cloud environment 210 (e.g., without adding to the cloud environment 210 or increasing compute costs significantly).

The cloud environment 210 may store a first snapshot 220 of a computing object, which may be a full snapshot 220 of the computing object. After a first duration, the cloud environment 210 may store a second snapshot 220 of the computing object, which may be a first incremental snapshot 220 relative to the first snapshot 220. The first incremental snapshot 220 may include one or more first data blocks of the computing object that have changed during the first duration. To reduce storage costs associated with the cloud environment 210, the DMS 205 may replicate the first snapshot 220 to the archival environment 215 and then delete the first snapshot 220 from the cloud environment 210. For example, to replicate the first snapshot 220 to the archival environment 215, the DMS 205 may obtain an indication of the changed data blocks from the cloud environment 210, and the DMS 205 may read the one or more first data blocks from a mount of the first incremental snapshot 220. The DMS 205 may store the one or more first data blocks as a first archival snapshot 220 in the archival environment 215.

After a second duration, the cloud environment 210 may store a second incremental snapshot 220 of the computing object including one or more second data blocks that have changed during the second duration. Similar to the first archival snapshot 220, the DMS 205 205 may generate and store a second archived incremental snapshot 220 based on the second incremental snapshot 220. The cloud environment 210 may merge the second snapshot 220 and the second incremental snapshot 220 to generate a third snapshot 220, and the second snapshot 220 may be deleted from the cloud environment 210.

In some cases, it may be beneficial to have an incremental snapshot 220 represent changes to a computing object relative to an earlier snapshot 220 that is not the immediately prior snapshot 220. This may, for example, reduce the latency of a restore operation for the point in time corresponding to the incremental snapshot 220 by reducing the length of an associated snapshot 220 chain used for the restore operation, among other potential benefits. This may be referred to as tree-based snapshot 220 management (e.g., as opposed to linear snapshot 220 management in which each incremental snapshot 220 of a computing object is relative to an immediately most recent prior snapshot 220). For tree-based snapshot 220 management, a most recent incremental snapshot 220 may include one or more data blocks that have changed relative to a previous snapshot 220 or incremental snapshot 220 that has been removed from the cloud environment 210 in accordance with the archival policy. For example, a third incremental snapshot 220 may include data blocks that have changed relative to the first snapshot 220 (which has been removed from the primary data base). The DMS 205 may not obtain, from the cloud environment 210, an indication of the changed data blocks to generate a third archived incremental snapshot 220 based on the cloud environment 210 removing the first snapshot 220 and the second snapshot 220.

According to techniques described herein, the DMS 205 may merge multiple snapshots 220 including where the snapshots 220 are distributed across a cloud environment 210 and an archival environment 215. The DMS 205 may determine one or more data blocks associated with an incremental snapshot 220 based on one or more snapshots 220 stored in a cloud environment 210 and one or more snapshots 220 stored in an archival environment 215.

For example, the DMS 205 may generate a first list of one or more first data blocks based on determining one or more first data blocks that have changed between the first archival snapshot 220 and the second archived incremental snapshot 220. The DMS 205 may compare a first fingerprint file associated with the first archival snapshot 220 and a second fingerprint files associated with the second archival snapshot 220. The DMS 205 may generate a second list of one or more second data blocks based on determining the one or more second data blocks have changed between the third incremental snapshot 220 and the third snapshot 220. The DMS 205 may merge the first list of changed blocks and the second list of changed blocks to store a third archived incremental snapshot 220.

Figure 3:
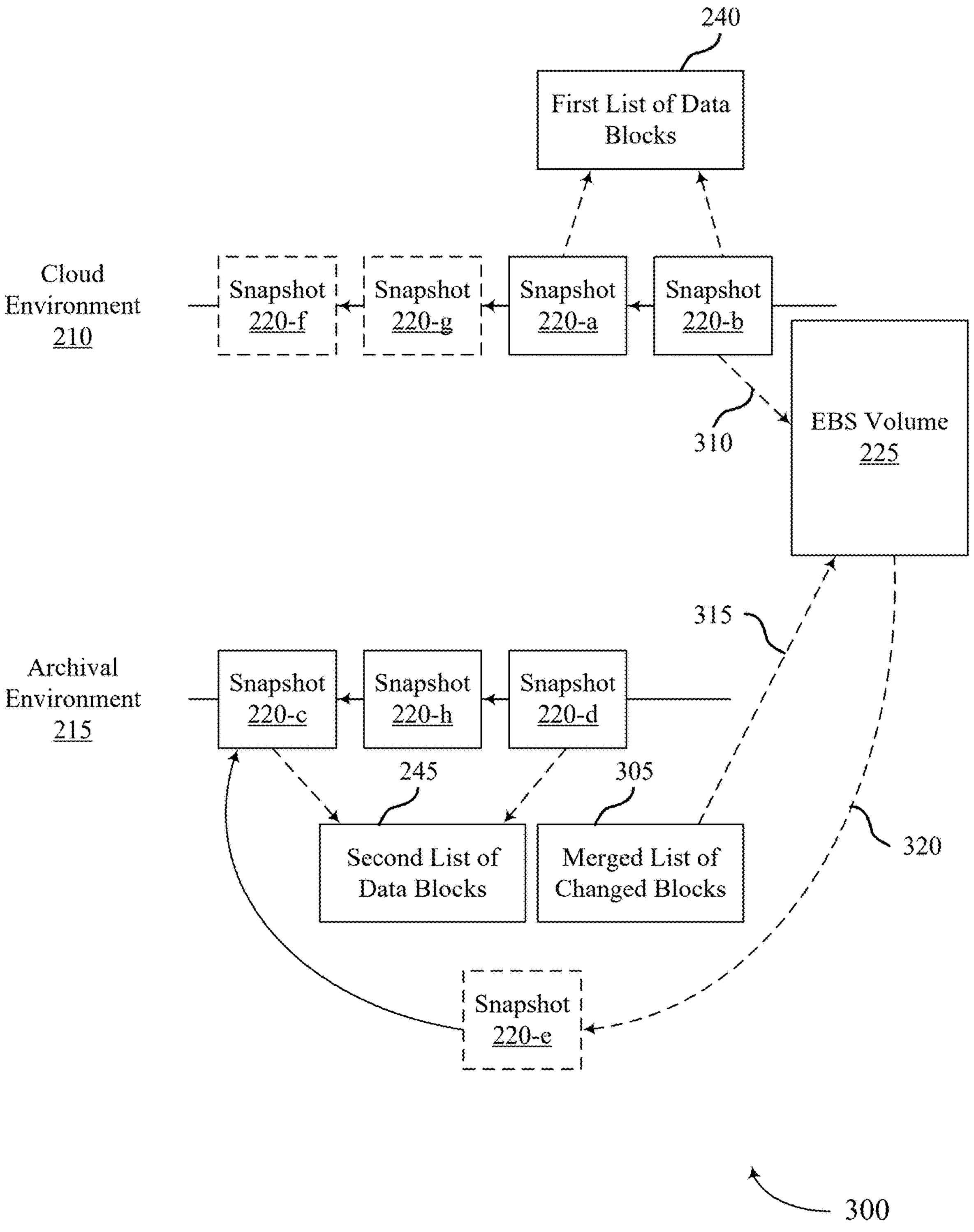
FIG. 3 shows an example of a snapshot generation diagram that supports multi-way merger of computing snapshots in accordance with aspects of the present disclosure.

FIG. 3 shows an example of a snapshot generation diagram 300 that supports multi-way merger of computing snapshots in accordance with aspects of the present disclosure. The snapshot generation diagram 300 may implement or be implemented by aspects of the computing environment 100 described with reference to FIG. 1 or the system diagram 200 described with reference to FIG. 2. For example, the snapshot generation diagram may include the cloud environment 210, the archival environment 215, and the EBS volume 225 as described with reference to FIG. 2. The cloud environment 210 may previously include deleted source snapshot 220-*f* and deleted source snapshot 220-*g*. Additionally, or alternatively, the cloud environment 210 may include the source snapshot 220-*a* and the source snapshot 220-*b* as described with reference to FIG. 2. The archival environment 215 may include archival snapshot 220-*c*, archival snapshot 220-*h*, and archival snapshot 220-*d* as described with reference to FIG. 2. The EBS volume 225 may be included in the cloud environment 210, the archival environment 215, or a DMS, such as the DMS 205 described with reference to FIG. 2.

The DMS 205 may write a new archival snapshot 220-*e* on top of a base archival snapshot 220-*c*, where a source snapshot 220-*f* corresponding to the archival snapshot 220-*c*, representative of the computing object at the same point in time, may be deleted or removed from the cloud environment 210. In order to write the new archival snapshot 220-*e*, the DMS 205 may calculate the delta change blocks between the deleted source snapshot 220-*f* and a new source snapshot 220-*b*. Although the deleted source snapshot 220-*f* may be deleted from the cloud environment 210, the corresponding archival snapshot 220-*c* (e.g., archival correspondent or the archival base) may exists on the archival environment 215. A previous archival snapshot 220-*d* (e.g., the archival correspondent of source snapshot 220-*a* or source base snapshot) may still exists on archival environment 215. The previous archival snapshot 220-*d* may be an archival snapshot 220 immediately prior to the new archival snapshot 220-*e*.

The DMS 205 may call the list changed blocks API on the cloud environment 210 to generate a first list of data blocks 240 that have changed between the base source snapshot 220-*a* and the new source snapshot 220-*b*, as described with reference to FIG. 2. The DMS 205 may compute the difference between archival snapshot 220-*c*, which may include the contents of source snapshot 220-*f*, and the previous archival snapshot 220-*d*, which may include the contents of source snapshot 220-*a*, to generate a second list of data blocks 245. The DMS 205 may merge the first list of data blocks 240 with the second list of data blocks 245 to generate a merged list of data blocks 305. If the DMS 205 calculates the second list of data blocks 245, the DMS 205 may generate the new archival snapshot 220-*e* based on the merged list of data blocks 305. For example, the merged list of data blocks 305 may include the data blocks that have changed between the new source snapshot 220-*b* and the deleted source snapshot 220-*f*.

For each content (e.g., each snapshot 220), the DMS 205 may store a patch file including the data contained in a snapshot block at a granularity (e.g., 64 KB) and a fingerprint file including a hash of the data (e.g., for each data block of 64 KB, the DMS 205 may store a 20 bytes hash using zero optimized secure hash algorithm (SHA1)). A patch file builder of the DMS 205 may leverage the fingerprint files for deduplicating the previous archival snapshot 220-*d* against the base archival snapshot 220-*c* (e.g., base file) while creating the new archival snapshot 220-*e* (e.g., a patch file for archived content). For example, the DMS 205 may leverage the fingerprint files to compute the second list of data blocks 245 (e.g., the blocks that have changed between the base archival snapshot 220-*c* and the previous archival snapshot 220-*d*) by comparing the hashes for each block in memory. While the DMS 205 may store data at a first granularity or data blocks size (e.g., 64 KB), the cloud environment 210 may store data at a second granularity or data blocks size (e.g., 512 KB or 4 MB). The block size of a patch file format (e.g., a block size associated with the archival environment 215) may be a factor of a cloud block size (e.g., a block size associated with the cloud environment 210).

In an illustrative example, the DMS 205 may write differential snapshot files in a tree based snapshot management format. For example, the DMS 205 may write an incremental snapshot 220 (e.g., the new archival snapshot 220-*e*) dependent on a base snapshot 220 (e.g., the base archival snapshot 220-*c*). The DMS 205 may compute changed data blocks for a source base (e.g., the source snapshot 220-*a*) over an archival base (e.g., the base archival snapshot 220-*c*). In tree based snapshot management, the source base and the archival base may not correspond (e.g., when there is a branching introduced). The DMS 205 may compute which data blocks have changed between the source snapshot 220-*a* and the base archival snapshot 220-*c*, which may be the same as the data blocks that have changed between the source snapshot 220-*a* and the deleted source snapshot 220-*f*. Since the deleted source snapshot 220-*f* may no longer be available on the cloud environment 210, the DMS 205 may use the base archival snapshot 220-*c* and compute a delta (e.g., the second list of data blocks 245) of the base archival snapshot 220-*c* over the previous archival snapshot 220-*d*.

To compute the delta between archival snapshots 220, the DMS 205 may read a first fingerprint file (fp1), including one or more fingerprints of data blocks, for the base archival snapshot 220-*c*. The DMS 205 may read a second fingerprint file (fp2) for the previous archival snapshot 220-*d* (e.g., the archival counterpart of the source base, such as the source snapshot 220-*a*). The DMS 205 may construct a set (F={fp3−fp1}) to realize the offsets which have changed over from the archival base (e.g., the base archival snapshot 220-*c*) to source base (e.g., the base source snapshot 220-*a*). In other words, the DMS 205 may generate the second list of data blocks 245 based on comparing the one or more fingerprints of the first fingerprint file with the one or more fingerprints of the second fingerprint file.

The DMS 205 may determine a logical size of a snappable divided into buckets of cloud vendor supported block size (e.g., 512 KB or 4 MB), and the DMS 205 may map the set (F) to those buckets. That is, the DMS 205 may construct a list of data blocks that have changed between the base archival snapshot 220-*c* and the base source snapshot 220-*a* (e.g., the second list of data blocks 245).

The DMS 205 compute changed blocks for an incoming source snapshot 220-*b* over the source base (e.g., the source snapshot 220-*a*). For example, the DMS 205 may use the list changed block API on the source snapshot 220-*a* and the source snapshot 220-*b* to obtain the data blocks that have changed between the base source snapshot 220-*a* and the new source snapshot 220-*b*. In other words, the DMS 205 may use the list changed block API to obtain the first list of data blocks 240.

The DMS 205 may compute changed blocks for the incoming source snapshot (e.g., the new source snapshot 220-*b*) over the archival base (e.g., the base archival snapshot 220-*c*) based on the first list of data blocks 240 and the second list of data blocks 245. The DMS 205 may merge sets of changed data blocks (e.g., the first list of data blocks 240 and the second list of data blocks 245) to realize a merged list of data blocks 305, representative of data blocks that have changed between the base archival snapshot 220-*c* and the new source snapshot 220-*b*. In case of ties based on offset, the DMS 205 may choose the block from the first list of data blocks 240, as the first list of data blocks 240 may contain the latest data for the snappable.

At operation 310, the DMS 205 may mount the EBS volume 225 with the source snapshot 220-*b*. For example, the DMS 205 may attach the source snapshot 220-*b* to an exocompute node. At operation 315, the DMS 205 may read selective blocks (e.g., the data blocks included in the merged list of data blocks 305) from the disk (e.g., the EBS volume 225). At operation 320, the DMS 205 may create a patch file (e.g., the new archival snapshot 220-*e*) based on the merged list of data blocks 305. For example, the patch file builder of the DMS 205 may write the blocks for a differential file (e.g., the new archival snapshot 220-*e*) to the archival environment 215.

The DMS 205 may merge the list of data blocks (e.g., the first list of data blocks 240 and the second list of data blocks 245) based on comparing an incremental content on a block-based storage system (e.g., a cloud environment 210) against any older archived or backed up content on another block-based storage system (e.g., an archival environment 215).

Although initially described in the context of archiving source snapshots 220 on a cloud environment 210 (e.g., cloud vendor) as a differential (e.g., incremental snapshot 220), the DMS 205 may use the same techniques described herein to move data across block-based storage systems, increasing efficiency based on the complexity of data blocks moved being bounded by the order of storage keeping the differential on archival. For example, the snapshots 220 may be an example of any computing object stored on a block-based storage system. The added complexity in the overall algorithm may be minimal in terms of time and memory overhead. For example, moving data blocks between block-based storage systems in accordance with the techniques described herein may move data across block-based storage systems while avoiding extra read or write operations and hence may provide low (e.g., zero) read and write amplification.

To generate the second list of data blocks 245, the DMS 205 may compare the hashes for the blocks over a logical size by buffering two strings of a first size (e.g., 20 bytes) in memory and checking them for equality in an O(1) time. The DMS 205 may use a zero-optimized SHA-1 hashing to perform the checking. The zero-optimized SHA-1 hashing may increase efficiency for computing a hash for zero-filled blocks (e.g., compared to computing the full SHA-1 hash for zero-filled blocks). For example, the DMS 205 may directly recognize such blocks and map them to a precomputed or known hash for a zero-filled block (e.g., zero content). Zero filled blocks may be common scenario in a storage systems where a lot of space may be kept unused or left empty. Comparing the hashes for the data blocks enables the DMS 205 to realize which of the data blocks have changed such that the data blocks were zeroed. For example, a data block may not contain data anymore (e.g., contain all zeros), in which case the DMS 205 may avoid a read call for such data blocks, and the DMS 205 may directly request the patch file builder to reference a zero block at the position.

Figure 4:
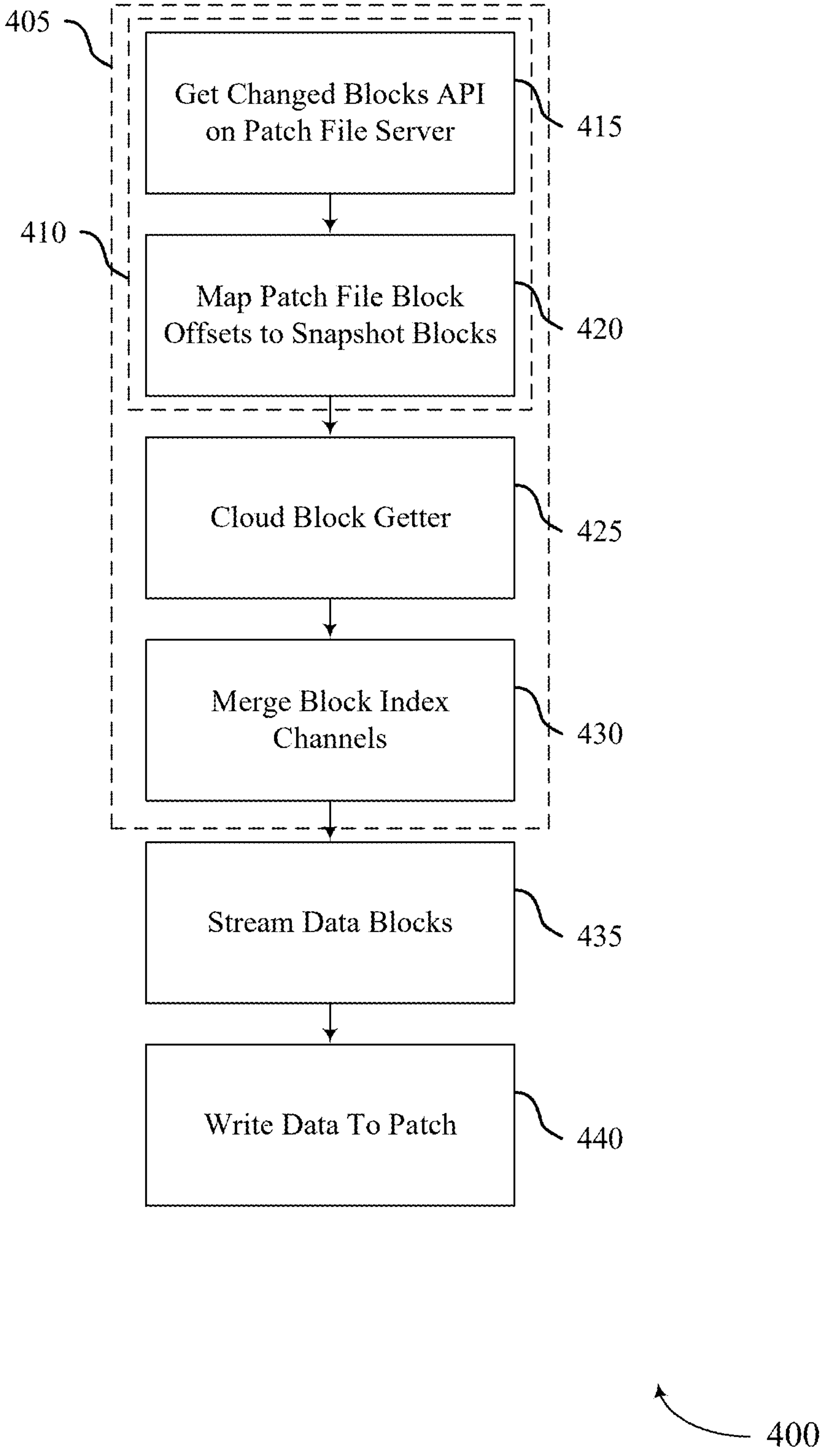
FIG. 4 shows an example of a flowchart that supports multi-way merger of computing snapshots in accordance with aspects of the present disclosure.

FIG. 4 shows an example of a flowchart 400 that supports multi-way merger of computing snapshots in accordance with aspects of the present disclosure. The flowchart 400 may implement or be implemented by aspects of FIGS. 1-3. For example, the flowchart 400 may be implemented by a DMS, such as the DMS 205 described with reference to FIG. 2.

At operation 405, the DMS may implement a get changed block procedure (e.g., GetChangedBlocks, or alternatively GetAllChangedBlocks). As part of the get changed blocks procedure, at operation 410, the DMS 205 may implement a patch file block getter procedure (e.g., PatchFileBlockGetter).

As part of the patch file block getter procedure at operation 410, the DMS may implement a get changed blocks API on patch file server procedure at operation 415. The DMS may obtain the offsets which got overwritten to realize the data delta between a base archival snapshot and a previous archival snapshot, such as the base archival snapshot 220-*c* and the previous archival snapshot 220-*d* as described with reference to FIGS. 2 and 3. At the patch file server layer, the DMS may utilize an API to compare the fingerprints of the base archival snapshot and the fingerprints of the previous archival snapshot, and the patch file server may return the overwritten offsets (e.g., the second list of data blocks). The API to compare the fingerprints may include pagination support to return to a capacity or blocks size of a packet file format blocks channel (e.g., PatchFileFormatBlocksChannel) to address memory concerns. The API implementation may involve loading fingerprint blocks one by one in memory and checking for equality to realize if a data block has changed in a base source snapshot (e.g., the base source snapshot 220-*a* as described with reference to FIGS. 2 and 3) relative to a base archival snapshot (e.g., the base archival snapshot 220-*c* as described with reference to FIGS. 2 and 3).

As another part of the patch file block getter procedure at operation 410, the DMS may implement a map patch file block offsets to snapshot blocks procedure (e.g., MapPatchFileBlockOffsetsToSnapshotBlocks) at operation 420. The DMS may fetch the changed data blocks, and the changed data blocks may be in a patch file format. The DMS may map the changed data blocks in accordance with a cloud native snapshot block size. For example, the changed data blocks may include three blocks (e.g., {64, 576,2112}) overwritten in accordance with a patch file format (e.g., block size: 64 KB). The cloud native snapshot block size may be different than the patch file format (e.g., block size: 512 KB). The DMS may map the changed data blocks to previous multiple blocks of the cloud native snapshot block size (e.g., 512 KB) to read the changed data blocks at a particular blocks (e.g., {64, 576, 2112}→{0, 512, 2048}).

The patch file block getter procedure at operation 410 (e.g., including operations 415 and 420 therein) may implement a stream changed block interface (e.g., StreamChangedBlocks interface). The DMS may use the fingerprint files for source base snapshot and archival base snapshot as input to the stream changed block interface to populate a native block channel of the patch file block getter procedure.

As part of the get changed blocks procedure at operation 405, the DMS may implement a cloud block getter procedure (e.g., CloudBlockGetter) at operation 425. The DMS may call the list changed blocks API on the cloud environment 210 to obtain a delta between a base source snapshot and a new source snapshot, such as a base source snapshot 220-*a* and a new source snapshot 220-*b* as described with reference to FIGS. 2 and 3.

As another part of the get changed blocks procedure at 405, the DMS may implement a merged block index channels procedure (e.g., MergeBlockIndexChannels) at operation 430. The merged block index channels procedure may handle merging the channel of blocks gathered (e.g., from the archival environment 215) by the patch file block getter procedure at operation 415 and the channel of blocks gathered (e.g., from the cloud environment 210) by the cloud block getter procedure at operation 425. Blocks across both the input channels (e.g., a cloud blocks channel and a patch file blocks channel) may be sorted by index. As such, the output channel (e.g., blocks channel) may be sorted by index. When an index matches for two blocks from the respective channels, the block from the cloud blocks channel (e.g., cloud source) may be chosen to be put into the output channel (e.g., blocks channel) since the cloud source contains the latest data.

For example, the get changed blocks operation at 405 (e.g., including operations 415, 420, 425, and 430 therein) may fetch the data blocks that have changed in a logical space (e.g., [startOffset, endOffset]) for a given shard of a snappable. In some examples, the changed offsets may be calculated using three goroutines. A first goroutine, executing the patch file block getter procedure at operation 410, may stream changed block offsets between a base archival snapshot (e.g., the base archival snapshot 220-*c* as described with reference to FIGS. 2 and 3) and a previous archival snapshot (e.g., the previous archival snapshot 220-*d* or the corresponding base source snapshot 220-*a* as described with reference to FIGS. 2 and 3). Thus, for example, the first goroutine may yield a first list of data blocks 240 as described with reference to FIGS. 2 and 3. A second goroutine, executing the cloud block getter at operation 425, may stream changed block offsets between the base source snapshot (e.g., the base source snapshot 220-*a* or a corresponding previous archival snapshot 220-*d* as described with reference to FIGS. 2 and 3) and the new source snapshot (e.g., the new source snapshot 220-*b* as described with reference to FIGS. 2 and 3). Thus, for example, the second goroutine may yield a second list of data blocks 245 as described with reference to FIGS. 2 and 3. A third goroutine, executing the merge block index channels procedure at operation 430, may merge the two streams in a sorted order of increasing offsets using the merge block index channels. Thus, for example, the third goroutine may yield a merged list of changed blocks 305 as described with reference to FIGS. 2 and 3.

In some cases, multiple data blocks from the two streams (e.g., the first stream that includes the first list of data blocks 240 and the second stream that includes the second list of data blocks 245) may include a same offset. In such cases, the merge block index channels procedure may select the data blocks with the same offset from the data blocks of the cloud environment (e.g., from the first stream, such as from the first list of data blocks 240 as described with reference to FIGS. 2 and 3), rather than from the data blocks of the archival environment (e.g., corresponding to the second stream and the second list of data blocks 245). The data blocks at the cloud environment may be associated with a more recent (e.g., most recent) snapshot, relative to the data blocks at the archival environment. For example, the new source snapshot 220-*b* may be more recent than the previous archival snapshot 220-*d*.

The DMS may implement a stream data blocks procedure at operation 435. The DMS may read selective data blocks (e.g., data blocks included in the merge block index channels) from the new source snapshot. The DMS may implement a write to patch procedure at operation 440. The DMS may write the selective data blocks to the archival environment to generate the new archival snapshot.

Figure 5:
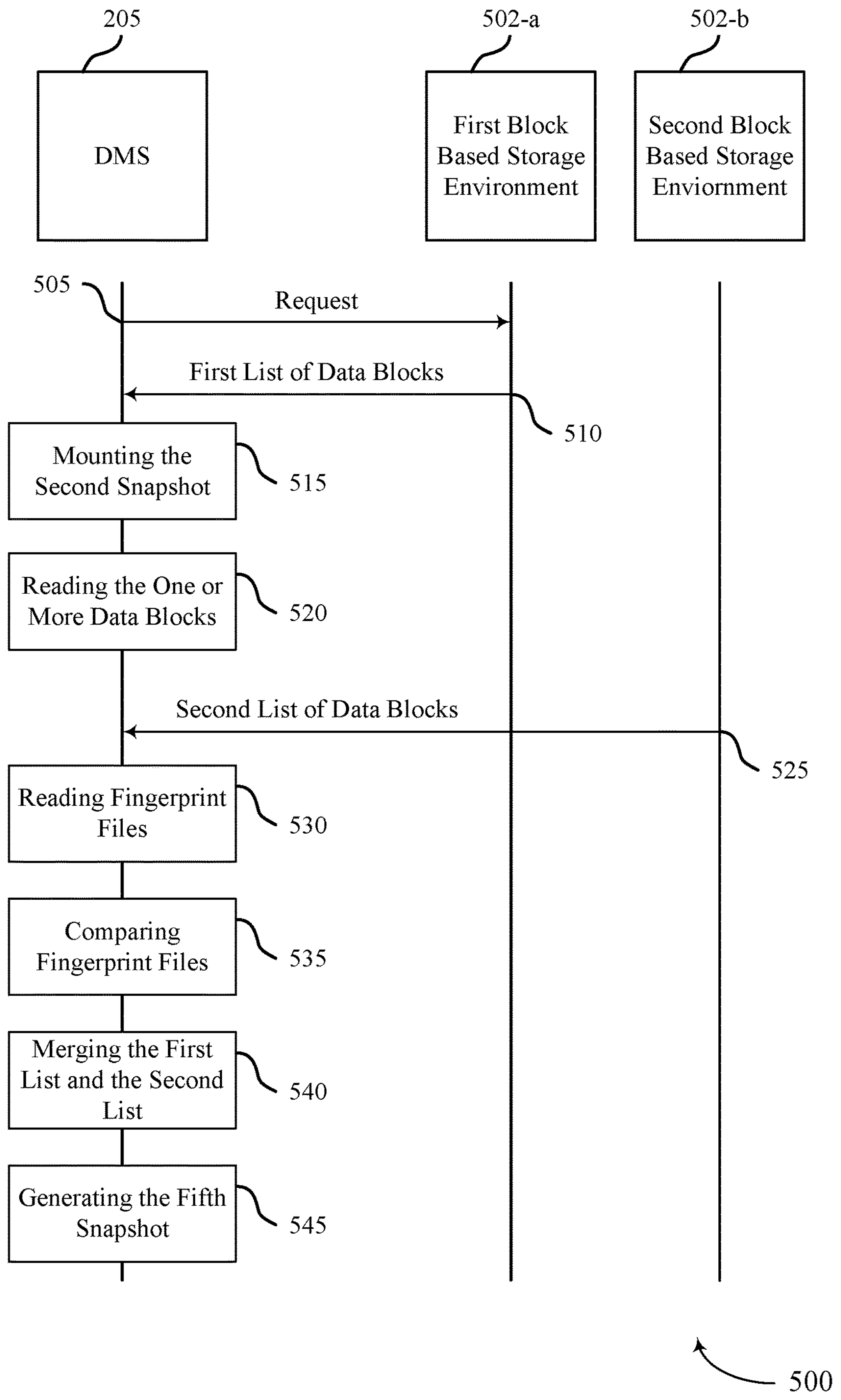
FIG. 5 shows an example of a process flow that supports multi-way merger of computing snapshots in accordance with aspects of the present disclosure.

FIG. 5 shows an example of a process flow 500 that supports multi-way merger of computing snapshots in accordance with aspects of the present disclosure. The process flow 500 may implement or be implemented by aspects of FIGS. 1-4. For example, the process flow 500 may include a DMS 205 as descried with reference to FIGS. 2-4. As another example, the process flow 500 may include a first block-based storage environment and a second block-based storage environment, which may be examples of a cloud environment 210 and an archival environment 215 as described with reference to FIG. 2—In the following description of the flowchart 400, operations between the DMS 205, the cloud environment 210, and the archival environment 215 may be added, omitted, or performed in a different order (with respect to the exemplary order shown). The DMS 205 may be in communication with a first block-based storage environment 502-*a* and a second block-based storage environment 502-*b*.

At 505, the DMS 205 may output, to the first block-based storage environment 502-*a*, a request for a first list of one or more first data blocks (e.g., the first list of data blocks 240, as described with reference to FIGS. 2 and 3).

At 510, the DMS 205 may obtain, the first list of one or more first data blocks associated with one or more differences between a first snapshot (e.g., the base source snapshot 220-*a*, as described with reference to FIGS. 2-3) stored at the first block-based storage environment and a second snapshot (e.g., the new source snapshot 220-*b*, as described with reference to FIGS. 2-3) stored at the first block-based storage environment. The first snapshot may be representative of a computing object as of a first point in time, and the second snapshot may be representative of the computing object as of a second point in time. For example, the DMS 205 may obtain, from the first block-based storage environment 502-*a* and based on the request, an indication of the first list of one or more first data blocks.

At 515, the DMS 205 may mount the second snapshot to a block storage volume (e.g., the EBS volume 225, as described with reference to FIGS. 2 and 3) based on the indication of the first list of one or more first data blocks.

At 520, the DMS 205 may read the one or more third data blocks from the block storage volume based on the indication obtained from the first block-based storage environment.

At 525, the DMS 205 may obtain a second list of one or more second data blocks (e.g., the second list of data blocks 245, as described with reference to FIGS. 2 and 3) associated with one or more differences between a third snapshot (e.g., the base archival snapshot 220-*c*, as described with reference to FIGS. 2 and 3) stored at the second block-based storage environment and a fourth snapshot (e.g., the previous archival snapshot 220-*d*, as described with reference to FIGS. 2 and 3) stored at the second block-based storage environment 502-*b*. The third snapshot may be representative of the computing object as of a third point in time, and the fourth snapshot may be representative of the computing object as of the first point in time. In some cases, the first point in time may be earlier than the second point in time, and the third point in time may be between the first point in time and the second point in time.

At 530, the DMS 205 may read, from the second block-based storage environment 502-*b*, a first fingerprint file including fingerprints of data blocks associated with the third snapshot and a second fingerprint file including fingerprints of data blocks associated with the fourth snapshot.

At 535, the DMS 205 may compare the first fingerprint file with the second fingerprint file, and the DMS 205 may identify the one or more second data blocks based on one or more differences between the first fingerprint file and the second fingerprint file.

At 540, the DMS 205 may merge the first list of one or more first data blocks and the second list of one or more second data blocks to obtain a merged list of one or more third data blocks (e.g., the merged list of data blocks, as described with reference to FIG. 3).

In some cases, the DMS 205 may include, in the merged list of one or more third data blocks, a first data block-based on the first data block being included in the one or more first data blocks and not being included in the one or more second data blocks. In some cases, the DMS 205 may exclude, in the merged list of one or more third data blocks, a first data block-based on the first data block not being included in the one or more first data blocks and being included in the one or more second data block. In some cases, the DMS 205 may merge the first list of one or more first data blocks and the second list of one or more second data blocks based on the first snapshot and the fourth snapshot both being representative of the computing object at the third point in time.

At 545, the DMS 205 may generate a fifth snapshot (e.g., the new archival snapshot 220-*e*, as described with reference to FIGS. 2 and 3) within the second block-based storage environment 502-*b* that is representative of the computing object as of the second point in time based on the merged list of one or more third data blocks. The fifth snapshot may be an incremental snapshot that is representative of changes to the computing object relative to the third snapshot. In some examples, generating the fifth snapshot may be based on reading the one or more third data blocks from the block storage volume as described at operation 520. In some cases, the third snapshot, the fourth snapshot, and the fifth snapshot may be associated with tree-based snapshot management at the second block-based storage environment 502-*b*.

In some cases, the DMS 205 may convert one or more data blocks having a first block size associated with the first block-based storage environment 502-*a* to one or more corresponding data blocks having a second block size associated with the second block-based storage environment 502-*b*.

Figure 6:
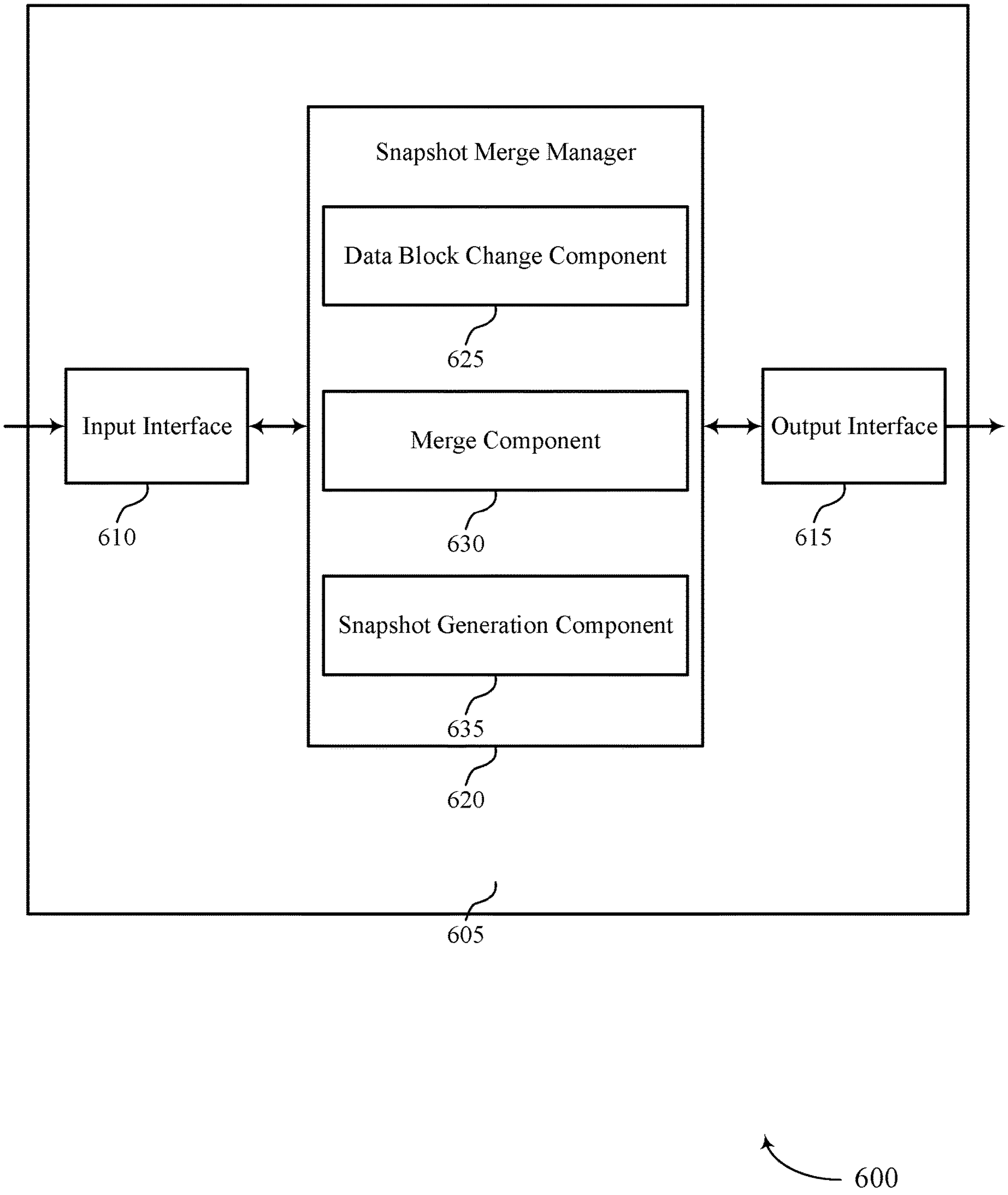
FIG. 6 shows a block diagram of an apparatus that supports multi-way merger of computing snapshots in accordance with aspects of the present disclosure.

FIG. 6 shows a block diagram 600 of a system 605 that supports multi-way merger of computing snapshots in accordance with aspects of the present disclosure. In some examples, the system 605 may be an example of aspects of one or more components described with reference to FIG. 1, such as a DMS 110. The system 605 may include an input interface 610, an output interface 615, and a Snapshot Merge Manager 620. The system 605 may also include one or more processors. Each of these components may be in communication with one another (e.g., via one or more buses, communications links, communications interfaces, or any combination thereof).

The input interface 610 may manage input signaling for the system 605. For example, the input interface 610 may receive input signaling (e.g., messages, packets, data, instructions, commands, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the Snapshot Merge Manager 620 to support multi-way merger of computing snapshots. In some cases, the input interface 610 may be a component of a network interface 825 as described with reference to FIG. 8.

The output interface 615 may manage output signaling for the system 605. For example, the output interface 615 may receive signaling from other components of the system 605, such as the Snapshot Merge Manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the Snapshot Merge Manager 620 may include a Data Block Change Component 625, a Merge Component 630, a Snapshot Generation Component 635, or any combination thereof. In some examples, the Snapshot Merge Manager 620, or various components thereof, may be configured to perform various operations (e.g., receiving, monitoring, transmitting) using or otherwise in cooperation with the input interface 610, the output interface 615, or both. For example, the Snapshot Merge Manager 620 may receive information from the input interface 610, send information to the output interface 615, or be integrated in combination with the input interface 610, the output interface 615, or both to receive information, transmit information, or perform various other operations as described herein.

The Data Block Change Component 625 may be configured as or otherwise support a means for obtaining, by a DMS in communication with a first block-based storage environment and a second block-based storage environment, a first list of one or more first data blocks associated with one or more differences between a first snapshot stored at the first block-based storage environment and a second snapshot stored at the first block-based storage environment, where the first snapshot is representative of a computing object as of a first point in time and the second snapshot is representative of the computing object as of a second point in time. The Data Block Change Component 625 may be configured as or otherwise support a means for obtaining, by the DMS, a second list of one or more second data blocks associated with one or more differences between a third snapshot stored at the second block-based storage environment and a fourth snapshot stored at the second block-based storage environment, where the third snapshot is representative of the computing object as of a third point in time and the fourth snapshot is representative of the computing object as of the first point in time. The Merge Component 630 may be configured as or otherwise support a means for merging, by the DMS, the first list of one or more first data blocks and the second list of one or more second data blocks to obtain a merged list of one or more third data blocks. The Snapshot Generation Component 635 may be configured as or otherwise support a means for generating, by the DMS, a fifth snapshot within the second block-based storage environment that is representative of the computing object as of the second point in time based on the merged list of one or more third data blocks, where the fifth snapshot is an incremental snapshot that is representative of changes to the computing object relative to the third snapshot.

Figure 7:
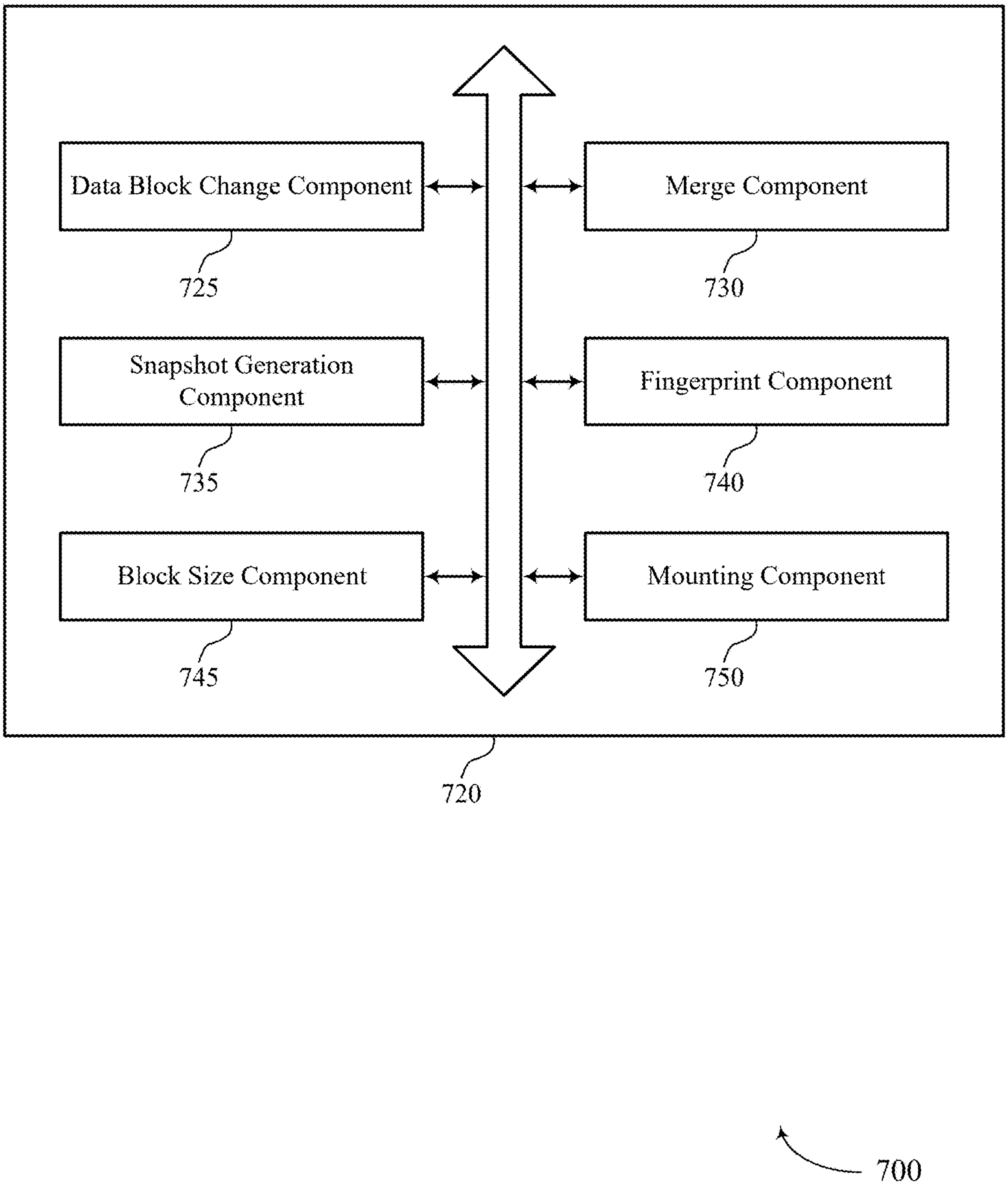
FIG. 7 shows a block diagram of a Snapshot Merge Manager that supports multi-way merger of computing snapshots in accordance with aspects of the present disclosure.

FIG. 7 shows a block diagram 700 of a Snapshot Merge Manager 720 that supports multi-way merger of computing snapshots in accordance with aspects of the present disclosure. The Snapshot Merge Manager 720 may be an example of aspects of a Snapshot Merge Manager or a Snapshot Merge Manager 620, or both, as described herein. The Snapshot Merge Manager 720, or various components thereof, may be an example of means for performing various aspects of multi-way merger of computing snapshots as described herein. For example, the Snapshot Merge Manager 720 may include a Data Block Change Component 725, a Merge Component 730, a Snapshot Generation Component 735, a Fingerprint Component 740, a Block Size Component 745, a Mounting Component 750, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The Data Block Change Component 725 may be configured as or otherwise support a means for obtaining, by a DMS in communication with a first block-based storage environment and a second block-based storage environment, a first list of one or more first data blocks associated with one or more differences between a first snapshot stored at the first block-based storage environment and a second snapshot stored at the first block-based storage environment, where the first snapshot is representative of a computing object as of a first point in time and the second snapshot is representative of the computing object as of a second point in time. In some examples, the Data Block Change Component 725 may be configured as or otherwise support a means for obtaining, by the DMS, a second list of one or more second data blocks associated with one or more differences between a third snapshot stored at the second block-based storage environment and a fourth snapshot stored at the second block-based storage environment, where the third snapshot is representative of the computing object as of a third point in time and the fourth snapshot is representative of the computing object as of the first point in time. The Merge Component 730 may be configured as or otherwise support a means for merging, by the DMS, the first list of one or more first data blocks and the second list of one or more second data blocks to obtain a merged list of one or more third data blocks. The Snapshot Generation Component 735 may be configured as or otherwise support a means for generating, by the DMS, a fifth snapshot within the second block-based storage environment that is representative of the computing object as of the second point in time based on the merged list of one or more third data blocks, where the fifth snapshot is an incremental snapshot that is representative of changes to the computing object relative to the third snapshot.

In some examples, the Data Block Change Component 725 may be configured as or otherwise support a means for outputting, by the DMS to the first block-based storage environment, a request for the first list of one or more first data blocks.

In some examples, to support obtaining the first list of one or more first data blocks, the Data Block Change Component 725 may be configured as or otherwise support a means for obtaining, from the first block-based storage environment and based on the request, an indication of the first list of one or more first data blocks.

In some examples, the Mounting Component 750 may be configured as or otherwise support a means for mounting the second snapshot to a block storage volume based on the indication of the first list of one or more first data blocks. In some examples, the Snapshot Generation Component 735 may be configured as or otherwise support a means for reading the one or more third data blocks from the block storage volume based on the indication obtained from the first block-based storage environment, where generating the fifth snapshot is based on reading the one or more third data blocks from the block storage volume.

In some examples, to support obtaining the second list of one or more second data blocks, the Fingerprint Component 740 may be configured as or otherwise support a means for reading, from the second block-based storage environment, a first fingerprint file including fingerprints of data blocks associated with the third snapshot and a second fingerprint file including fingerprints of data blocks associated with the fourth snapshot. In some examples, to support obtaining the second list of one or more second data blocks, the Fingerprint Component 740 may be configured as or otherwise support a means for comparing the first fingerprint file with the second fingerprint file. In some examples, to support obtaining the second list of one or more second data blocks, the Data Block Change Component 725 may be configured as or otherwise support a means for identifying the one or more second data blocks based on one or more differences between the first fingerprint file and the second fingerprint file.

In some examples, the first point in time is earlier than the second point in time. In some examples, the third point in time is between the first point in time and the second point in time.

In some examples, to support merging the first list of one or more first data blocks and the second list of one or more second data blocks, the Merge Component 730 may be configured as or otherwise support a means for including, in the merged list of one or more third data blocks, a first data block-based on the first data block being included in the one or more first data blocks and not being included in the one or more second data blocks.

In some examples, to support merging the first list of one or more first data blocks and the second list of one or more second data blocks, the Merge Component 730 may be configured as or otherwise support a means for excluding, in the merged list of one or more third data blocks, a first data block-based on the first data block not being included in the one or more first data blocks and being included in the one or more second data block.

In some examples, the third snapshot, the fourth snapshot, and the fifth snapshot are associated with tree-based snapshot management at the second block-based storage environment.

In some examples, to support generating the fifth snapshot, the Block Size Component 745 may be configured as or otherwise support a means for converting one or more data blocks having a first block size associated with the first block-based storage environment to one or more corresponding data blocks having a second block size associated with the second block-based storage environment.

In some examples, to support merging the first list of one or more first data blocks and the second list of one or more second data blocks, the Merge Component 730 may be configured as or otherwise support a means for merging the first list of one or more first data blocks and the second list of one or more second data blocks based on the first snapshot and the fourth snapshot both being representative of the computing object at the third point in time.

Figure 8:
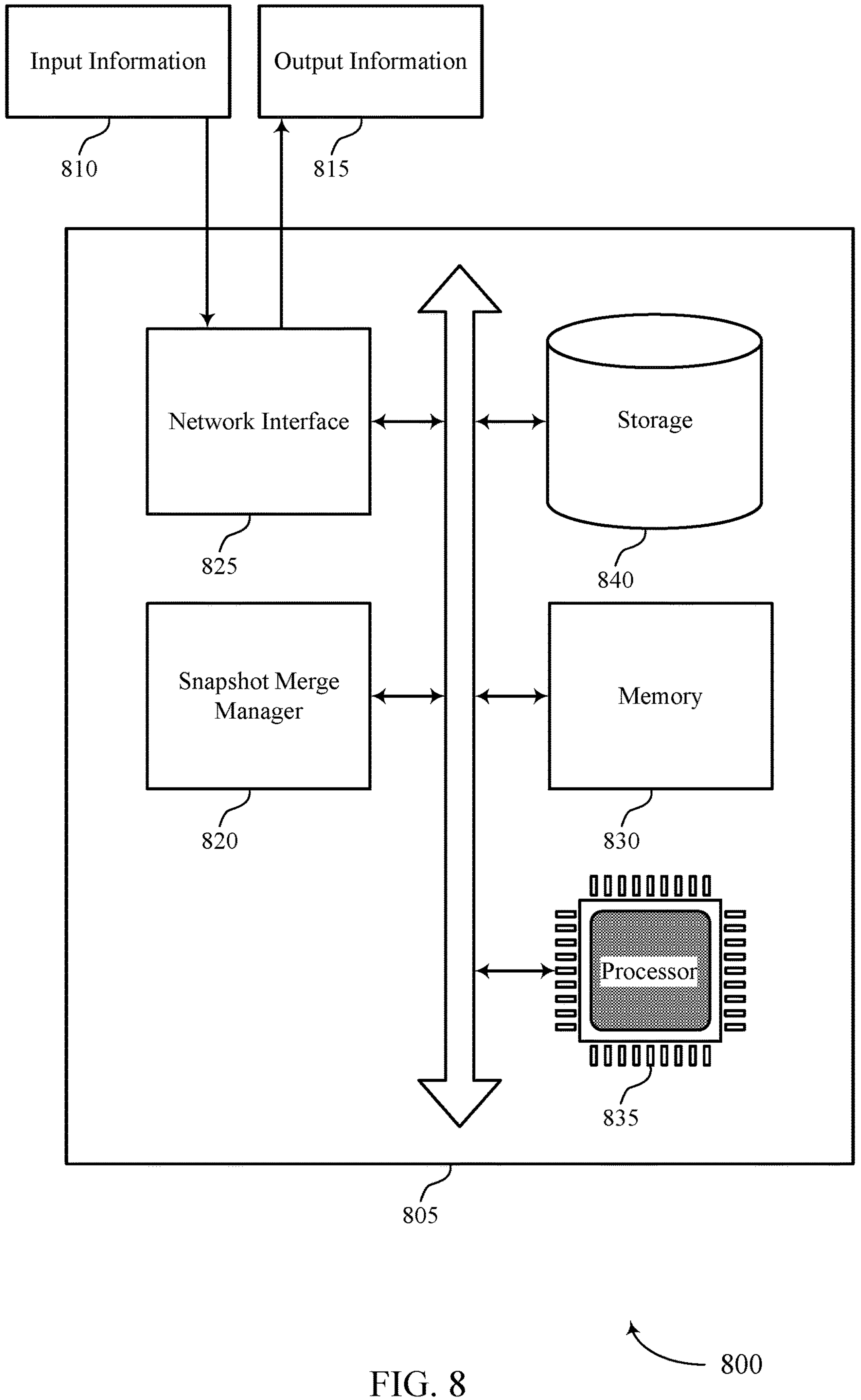
FIG. 8 shows a diagram of a system including a device that supports multi-way merger of computing snapshots in accordance with aspects of the present disclosure.

FIG. 8 shows a block diagram 800 of a system 805 that supports multi-way merger of computing snapshots in accordance with aspects of the present disclosure. The system 805 may be an example of or include components of a system 605 as described herein. The system 805 may include components for data management, including components such as a Snapshot Merge Manager 820, an input information 810, an output information 815, a network interface 825, at least one memory 830, at least one processor 835, and a storage 840. These components may be in electronic communication or otherwise coupled with each other (e.g., operatively, communicatively, functionally, electronically, electrically; via one or more buses, communications links, communications interfaces, or any combination thereof). Additionally, the components of the system 805 may include corresponding physical components or may be implemented as corresponding virtual components (e.g., components of one or more virtual machines). In some examples, the system 805 may be an example of aspects of one or more components described with reference to FIG. 1, such as a DMS 110.

The network interface 825 may enable the system 805 to exchange information (e.g., input information 810, output information 815, or both) with other systems or devices (not shown). For example, the network interface 825 may enable the system 805 to connect to a network (e.g., a network 120 as described herein). The network interface 825 may include one or more wireless network interfaces, one or more wired network interfaces, or any combination thereof. In some examples, the network interface 825 may be an example of may be an example of aspects of one or more components described with reference to FIG. 1, such as one or more network interfaces 165.

Memory 830 may include RAM, ROM, or both. The memory 830 may store computer-readable, computer-executable software including instructions that, when executed, cause the processor 835 to perform various functions described herein. In some cases, the memory 830 may contain, among other things, a basic input/output system (BIOS), which may control basic hardware or software operation such as the interaction with peripheral components or devices. In some cases, the memory 830 may be an example of aspects of one or more components described with reference to FIG. 1, such as one or more memories 175.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in a memory 830 to perform various functions (e.g., functions or tasks supporting multi-way merger of computing snapshots). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. In some cases, the processor 835 may be an example of aspects of one or more components described with reference to FIG. 1, such as one or more processors 170.

Storage 840 may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database. In some examples, the storage 840 may be an example of one or more components described with reference to FIG. 1, such as one or more network disks 180.

For example, the Snapshot Merge Manager 820 may be configured as or otherwise support a means for obtaining, by a DMS in communication with a first block-based storage environment and a second block-based storage environment, a first list of one or more first data blocks associated with one or more differences between a first snapshot stored at the first block-based storage environment and a second snapshot stored at the first block-based storage environment, where the first snapshot is representative of a computing object as of a first point in time and the second snapshot is representative of the computing object as of a second point in time. The Snapshot Merge Manager 820 may be configured as or otherwise support a means for obtaining, by the DMS, a second list of one or more second data blocks associated with one or more differences between a third snapshot stored at the second block-based storage environment and a fourth snapshot stored at the second block-based storage environment, where the third snapshot is representative of the computing object as of a third point in time and the fourth snapshot is representative of the computing object as of the first point in time. The Snapshot Merge Manager 820 may be configured as or otherwise support a means for merging, by the DMS, the first list of one or more first data blocks and the second list of one or more second data blocks to obtain a merged list of one or more third data blocks. The Snapshot Merge Manager 820 may be configured as or otherwise support a means for generating, by the DMS, a fifth snapshot within the second block-based storage environment that is representative of the computing object as of the second point in time based on the merged list of one or more third data blocks, where the fifth snapshot is an incremental snapshot that is representative of changes to the computing object relative to the third snapshot.

By including or configuring the Snapshot Merge Manager 820 in accordance with examples as described herein, the system 805 may support techniques for multi-way merger of computing snapshots, which may provide one or more benefits such as, for example, reduced latency, reduced power consumption, more efficient utilization of computing resources, among other possibilities.

Figure 9:
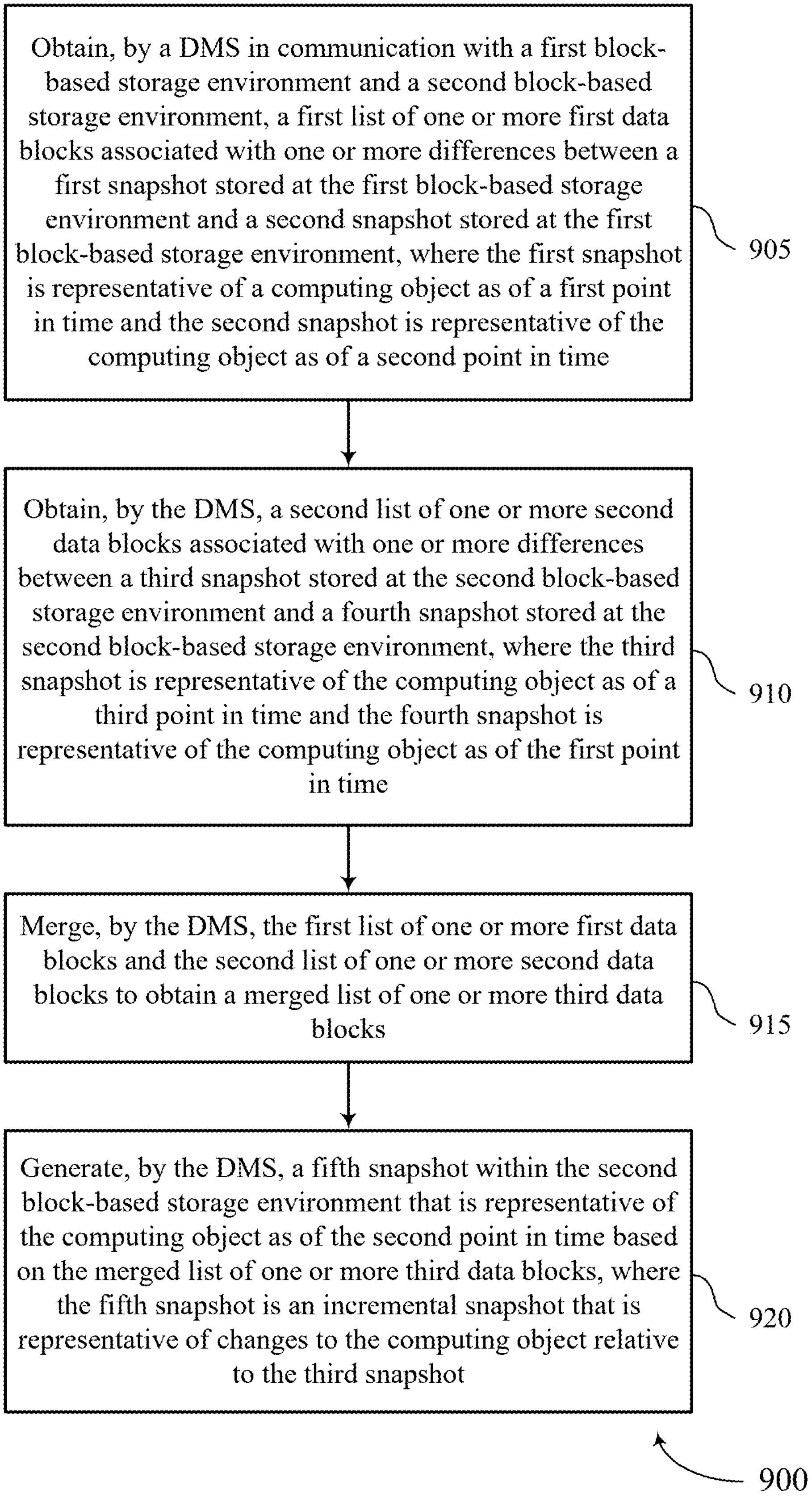
FIGS. 9 through 10 show flowcharts illustrating methods that support multi-way merger of computing snapshots in accordance with aspects of the present disclosure.

FIG. 9 shows a flowchart illustrating a method 900 that supports multi-way merger of computing snapshots in accordance with aspects of the present disclosure. The operations of the method 900 may be implemented by a DMS or its components as described herein. For example, the operations of the method 900 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 905, the method may include obtaining, by a DMS in communication with a first block-based storage environment and a second block-based storage environment, a first list of one or more first data blocks associated with one or more differences between a first snapshot stored at the first block-based storage environment and a second snapshot stored at the first block-based storage environment, where the first snapshot is representative of a computing object as of a first point in time and the second snapshot is representative of the computing object as of a second point in time. The operations of 905 may be performed in accordance with examples as disclosed herein. In some examples, aspects of the operations of 905 may be performed by a Data Block Change Component 725 as described with reference to FIG. 7.

At 910, the method may include obtaining, by the DMS, a second list of one or more second data blocks associated with one or more differences between a third snapshot stored at the second block-based storage environment and a fourth snapshot stored at the second block-based storage environment, where the third snapshot is representative of the computing object as of a third point in time and the fourth snapshot is representative of the computing object as of the first point in time. The operations of 910 may be performed in accordance with examples as disclosed herein. In some examples, aspects of the operations of 910 may be performed by a Data Block Change Component 725 as described with reference to FIG. 7.

At 915, the method may include merging, by the DMS, the first list of one or more first data blocks and the second list of one or more second data blocks to obtain a merged list of one or more third data blocks. The operations of 915 may be performed in accordance with examples as disclosed herein. In some examples, aspects of the operations of 915 may be performed by a Merge Component 730 as described with reference to FIG. 7.

At 920, the method may include generating, by the DMS, a fifth snapshot within the second block-based storage environment that is representative of the computing object as of the second point in time based on the merged list of one or more third data blocks, where the fifth snapshot is an incremental snapshot that is representative of changes to the computing object relative to the third snapshot. The operations of 920 may be performed in accordance with examples as disclosed herein. In some examples, aspects of the operations of 920 may be performed by a Snapshot Generation Component 735 as described with reference to FIG. 7.

Figure 10:
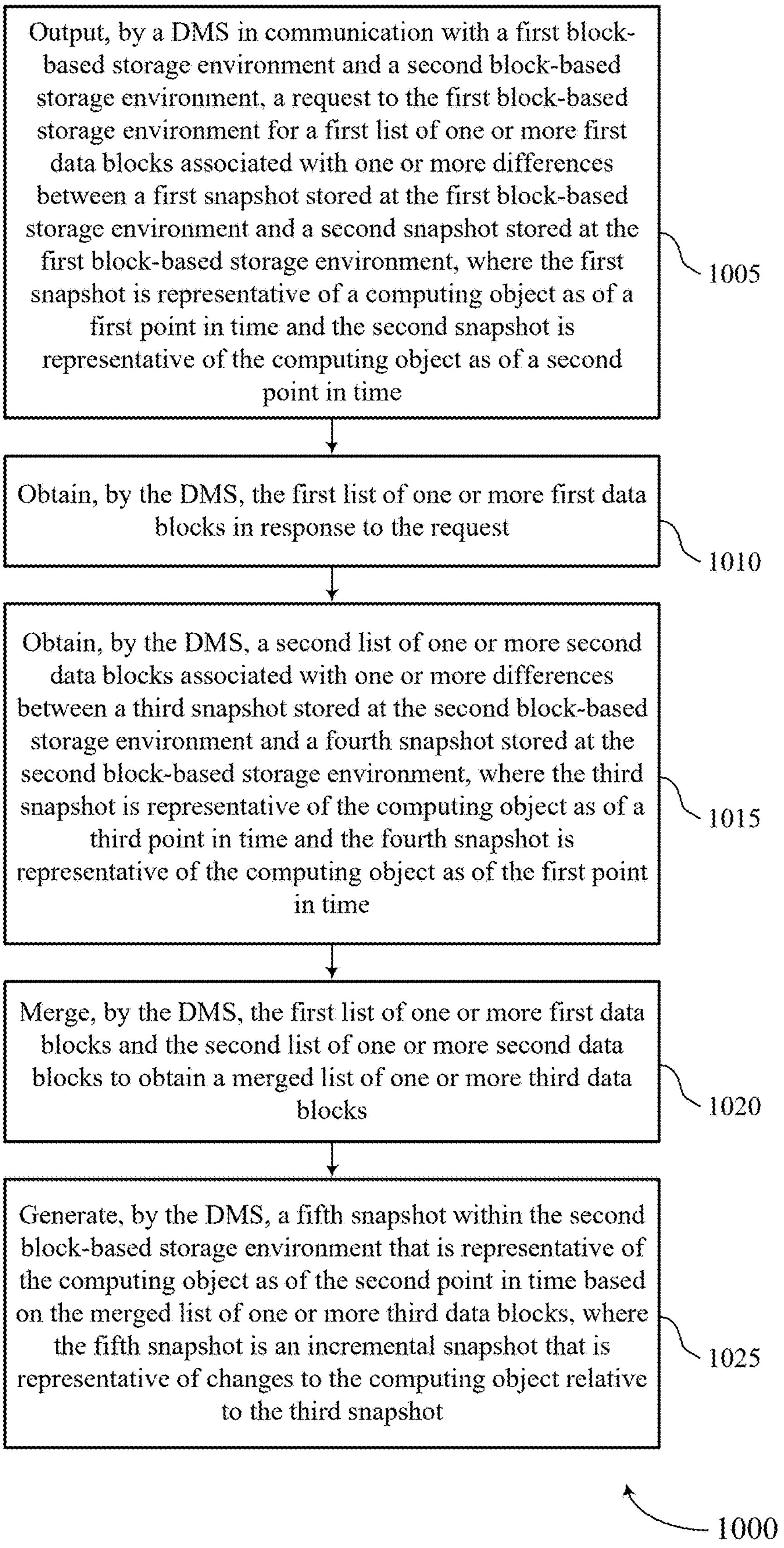

FIG. 10 shows a flowchart illustrating a method 1000 that supports multi-way merger of computing snapshots in accordance with aspects of the present disclosure. The operations of the method 1000 may be implemented by a DMS or its components as described herein. For example, the operations of the method 1000 may be performed by a DMS as described with reference to FIGS. 1 through 8. In some examples, a DMS may execute a set of instructions to control the functional elements of the DMS to perform the described functions. Additionally, or alternatively, the DMS may perform aspects of the described functions using special-purpose hardware.

At 1005, the method may include outputting, by a DMS in communication with a first block-based storage environment and a second block-based storage environment, a request to the first block-based storage environment for a first list of one or more first data blocks associated with one or more differences between a first snapshot stored at the first block-based storage environment and a second snapshot stored at the first block-based storage environment, where the first snapshot is representative of a computing object as of a first point in time and the second snapshot is representative of the computing object as of a second point in time. The operations of 1005 may be performed in accordance with examples as disclosed herein. In some examples, aspects of the operations of 1005 may be performed by a Data Block Change Component 725 as described with reference to FIG. 7.

At 1010, the method may include obtaining, by a DMS, the first list of one or more first data blocks in response to the request. The operations of 1010 may be performed in accordance with examples as disclosed herein. In some examples, aspects of the operations of 1010 may be performed by a Data Block Change Component 725 as described with reference to FIG. 7.

At 1015, the method may include obtaining, by the DMS, a second list of one or more second data blocks associated with one or more differences between a third snapshot stored at the second block-based storage environment and a fourth snapshot stored at the second block-based storage environment, where the third snapshot is representative of the computing object as of a third point in time and the fourth snapshot is representative of the computing object as of the first point in time. The operations of 1015 may be performed in accordance with examples as disclosed herein. In some examples, aspects of the operations of 1015 may be performed by a Data Block Change Component 725 as described with reference to FIG. 7.

At 1020, the method may include merging, by the DMS, the first list of one or more first data blocks and the second list of one or more second data blocks to obtain a merged list of one or more third data blocks. The operations of 1020 may be performed in accordance with examples as disclosed herein. In some examples, aspects of the operations of 1020 may be performed by a Merge Component 730 as described with reference to FIG. 7.

At 1025, the method may include generating, by the DMS, a fifth snapshot within the second block-based storage environment that is representative of the computing object as of the second point in time based on the merged list of one or more third data blocks, where the fifth snapshot is an incremental snapshot that is representative of changes to the computing object relative to the third snapshot. The operations of 1025 may be performed in accordance with examples as disclosed herein. In some examples, aspects of the operations of 1025 may be performed by a Snapshot Generation Component 735 as described with reference to FIG. 7.

The following provides an overview of aspects of the present disclosure:

Aspect 1: A method, comprising: obtaining, by a DMS in communication with a first block-based storage environment and a second block-based storage environment, a first list of one or more first data blocks associated with one or more differences between a first snapshot stored at the first block-based storage environment and a second snapshot stored at the first block-based storage environment, wherein the first snapshot is representative of a computing object as of a first point in time and the second snapshot is representative of the computing object as of a second point in time; obtaining, by the DMS, a second list of one or more second data blocks associated with one or more differences between a third snapshot stored at the second block-based storage environment and a fourth snapshot stored at the second block-based storage environment, wherein the third snapshot is representative of the computing object as of a third point in time and the fourth snapshot is representative of the computing object as of the first point in time; merging, by the DMS, the first list of one or more first data blocks and the second list of one or more second data blocks to obtain a merged list of one or more third data blocks; and generating, by the DMS, a fifth snapshot within the second block-based storage environment that is representative of the computing object as of the second point in time based at least in part on the merged list of one or more third data blocks, wherein the fifth snapshot is an incremental snapshot that is representative of changes to the computing object relative to the third snapshot.

Aspect 2: The method of aspect 1, further comprising: outputting, by the DMS to the first block-based storage environment, a request for the first list of one or more first data blocks.

Aspect 3: The method of aspect 2, wherein obtaining the first list of one or more first data blocks comprises: obtaining, from the first block-based storage environment and based at least in part on the request, an indication of the first list of one or more first data blocks.

Aspect 4: The method of aspect 3, further comprising: mounting the second snapshot to a block storage volume based at least in part on the indication of the first list of one or more first data blocks; and reading the one or more third data blocks from the block storage volume based at least in part on the indication obtained from the first block-based storage environment, wherein generating the fifth snapshot is based at least in part on reading the one or more third data blocks from the block storage volume.

Aspect 5: The method of any of aspects 1 through 4, wherein obtaining the second list of one or more second data blocks comprises: reading, from the second block-based storage environment, a first fingerprint file comprising fingerprints of data blocks associated with the third snapshot and a second fingerprint file comprising fingerprints of data blocks associated with the fourth snapshot; comparing the first fingerprint file with the second fingerprint file; and identifying the one or more second data blocks based at least in part on one or more differences between the first fingerprint file and the second fingerprint file.

Aspect 6: The method of any of aspects 1 through 5, wherein the first point in time is earlier than the second point in time, and the third point in time is between the first point in time and the second point in time.

Aspect 7: The method of any of aspects 1 through 6, wherein merging the first list of one or more first data blocks and the second list of one or more second data blocks comprises: including, in the merged list of one or more third data blocks, a first data block-based at least in part on the first data block being included in the one or more first data blocks and not being included in the one or more second data blocks.

Aspect 8: The method of any of aspects 1 through 7, wherein merging the first list of one or more first data blocks and the second list of one or more second data blocks comprises: excluding, in the merged list of one or more third data blocks, a first data block-based at least in part on the first data block not being included in the one or more first data blocks and being included in the one or more second data block.

Aspect 9: The method of any of aspects 1 through 8, wherein the third snapshot, the fourth snapshot, and the fifth snapshot are associated with tree-based snapshot management at the second block-based storage environment.

Aspect 10: The method of any of aspects 1 through 9, wherein generating the fifth snapshot comprises: converting one or more data blocks having a first block size associated with the first block-based storage environment to one or more corresponding data blocks having a second block size associated with the second block-based storage environment.

Aspect 11: The method of any of aspects 1 through 10, wherein merging the first list of one or more first data blocks and the second list of one or more second data blocks further comprises: merging the first list of one or more first data blocks and the second list of one or more second data blocks based at least in part on the first snapshot and the fourth snapshot both being representative of the computing object at the third point in time.

Aspect 12: An apparatus comprising one or more memories storing processor-executable code, and one or more processors coupled with the one or more memories and individually or collectively operable to execute the code to cause the apparatus to perform a method of any of aspects 1 through 11.

Aspect 13: An apparatus comprising at least one means for performing a method of any of aspects 1 through 11.

Aspect 14: A non-transitory computer-readable medium storing code the code comprising instructions executable by one or more processors to perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

obtaining, by a data management system (DMS) in communication with a first block-based storage environment and a second block-based storage environment, a first list of one or more first data blocks associated with one or more differences between a first snapshot stored at the first block-based storage environment and a second snapshot stored at the first block-based storage environment, wherein the first snapshot is representative of a computing object as of a first point in time and the second snapshot is representative of the computing object as of a second point in time;

obtaining, by the DMS, a second list of one or more second data blocks associated with one or more differences between a third snapshot stored at the second block-based storage environment and a fourth snapshot stored at the second block-based storage environment, wherein the third snapshot is representative of the computing object as of a third point in time and the fourth snapshot is representative of the computing object as of the first point in time;

merging, by the DMS, the first list of one or more first data blocks and the second list of one or more second data blocks to obtain a merged list of one or more third data blocks;

generating, by the DMS after merging the first list and the second list and using the merged list of the one or more third data blocks, a fifth snapshot within the second block-based storage environment that is representative of the computing object as of the second point in time, wherein the fifth snapshot is an incremental snapshot that is representative of changes to the computing object relative to the third snapshot based at least in part on the use of the merged list of the one or more third data blocks; and storing, within the second block-based storage environment, the fifth snapshot that is representative of the changes to the computing object relative to the third snapshot.

2. The method of claim 1, further comprising:

outputting, by the DMS to the first block-based storage environment, a request for the first list of one or more first data blocks.

3. The method of claim 2, wherein obtaining the first list of one or more first data blocks comprises:

obtaining, from the first block-based storage environment and based at least in part on the request, an indication of the first list of one or more first data blocks.

4. The method of claim 3, further comprising:

mounting the second snapshot to a block storage volume based at least in part on the indication of the first list of one or more first data blocks; and reading the one or more third data blocks from the block storage volume based at least in part on the indication obtained from the first block-based storage environment, wherein generating the fifth snapshot is based at least in part on reading the one or more third data blocks from the block storage volume.

5. The method of claim 1, wherein obtaining the second list of one or more second data blocks comprises:

reading, from the second block-based storage environment, a first fingerprint file comprising fingerprints of data blocks associated with the third snapshot and a second fingerprint file comprising fingerprints of data blocks associated with the fourth snapshot;

comparing the first fingerprint file with the second fingerprint file; and identifying the one or more second data blocks based at least in part on one or more differences between the first fingerprint file and the second fingerprint file.

6. The method of claim 1, wherein:

the first point in time is earlier than the second point in time, and the third point in time is earlier than the first point in time.

7. The method of claim 1, wherein merging the first list of one or more first data blocks and the second list of one or more second data blocks comprises:

including, in the merged list of one or more third data blocks, a first data block based at least in part on the first data block being included in the one or more first data blocks and not being included in the one or more second data blocks.

8. The method of claim 1, wherein merging the first list of one or more first data blocks and the second list of one or more second data blocks comprises:

excluding, in the merged list of one or more third data blocks, a first data block based at least in part on the first data block not being included in the one or more first data blocks and being included in the one or more second data blocks.

9. The method of claim 1, wherein the third snapshot, the fourth snapshot, and the fifth snapshot are associated with tree-based snapshot management at the second block-based storage environment.

10. The method of claim 1, wherein generating the fifth snapshot comprises:

converting one or more data blocks having a first block size associated with the first block-based storage environment to one or more corresponding data blocks having a second block size associated with the second block-based storage environment.

11. The method of claim 1, wherein merging the first list of one or more first data blocks and the second list of one or more second data blocks further comprises:

merging the first list of one or more first data blocks and the second list of one or more second data blocks based at least in part on the first snapshot and the fourth snapshot both being representative of the computing object at the first point in time.

12. An apparatus, comprising:

one or more memories storing processor-executable code; and one or more processors coupled with the one or more memories and individually or collectively operable to execute the code to cause the apparatus to:

obtain, by a data management system (DMS) in communication with a first block-based storage environment and a second block-based storage environment, a first list of one or more first data blocks associated with one or more differences between a first snapshot stored at the first block-based storage environment and a second snapshot stored at the first block-based storage environment, wherein the first snapshot is representative of a computing object as of a first point in time and the second snapshot is representative of the computing object as of a second point in time;

obtain, by the DMS, a second list of one or more second data blocks associated with one or more differences between a third snapshot stored at the second block-based storage environment and a fourth snapshot stored at the second block-based storage environment, wherein the third snapshot is representative of the computing object as of a third point in time and the fourth snapshot is representative of the computing object as of the first point in time;

merge, by the DMS, the first list of one or more first data blocks and the second list of one or more second data blocks to obtain a merged list of one or more third data blocks;

generate, by the DMS after merging the first list and the second list and using the merged list of the one or more third data blocks, a fifth snapshot within the second block-based storage environment that is representative of the computing object as of the second point in time, wherein the fifth snapshot is an incremental snapshot that is representative of changes to the computing object relative to the third snapshot based at least in part on the use of the merged list of the one or more third data blocks; and storing, within the second block-based storage environment, the fifth snapshot that is representative of the changes to the computing object relative to the third snapshot.

13. The apparatus of claim 12, wherein the one or more processors are individually or collectively further operable to execute the code to cause the apparatus to:

output, by the DMS to the first block-based storage environment, a request for the first list of one or more first data blocks.

14. The apparatus of claim 13, wherein, to obtain the first list of one or more first data blocks, the one or more processors are individually or collectively operable to execute the code to cause the apparatus to:

obtain, from the first block-based storage environment and based at least in part on the request, an indication of the first list of one or more first data blocks.

15. The apparatus of claim 14, wherein the one or more processors are individually or collectively further operable to execute the code to cause the apparatus to:

mount the second snapshot to a block storage volume based at least in part on the indication of the first list of one or more first data blocks; and read the one or more third data blocks from the block storage volume based at least in part on the indication obtained from the first block-based storage environment, wherein the one or more processors are individually or collectively operable to execute the code to cause the apparatus to generate the fifth snapshot based at least in part on reading the one or more third data blocks from the block storage volume.

16. The apparatus of claim 12, wherein, to obtain the second list of one or more second data blocks, the one or more processors are individually or collectively operable to execute the code to cause the apparatus to:

read, from the second block-based storage environment, a first fingerprint file comprising fingerprints of data blocks associated with the third snapshot and a second fingerprint file comprising fingerprints of data blocks associated with the fourth snapshot;

compare the first fingerprint file with the second fingerprint file; and identify the one or more second data blocks based at least in part on one or more differences between the first fingerprint file and the second fingerprint file.

17. The apparatus of claim 12, wherein:

the first point in time is earlier than the second point in time, and the third point in time is earlier than the first point in time.

18. The apparatus of claim 12, wherein, to merge the first list of one or more first data blocks and the second list of one or more second data blocks, the one or more processors are individually or collectively operable to execute the code to cause the apparatus to:

include, in the merged list of one or more third data blocks, a first data block based at least in part on the first data block being included in the one or more first data blocks and not being included in the one or more second data blocks.

19. The apparatus of claim 12, wherein, to merge the first list of one or more first data blocks and the second list of one or more second data blocks, the one or more processors are individually or collectively operable to execute the code to cause the apparatus to:

exclude, in the merged list of one or more third data blocks, a first data block based at least in part on the first data block not being included in the one or more first data blocks and being included in the one or more second data blocks.

20. A non-transitory computer-readable medium storing code, the code comprising instructions executable by one or more processors to:

obtain, by a data management system (DMS) in communication with a first block-based storage environment and a second block-based storage environment, a first list of one or more first data blocks associated with one or more differences between a first snapshot stored at the first block-based storage environment and a second snapshot stored at the first block-based storage environment, wherein the first snapshot is representative of a computing object as of a first point in time and the second snapshot is representative of the computing object as of a second point in time;

obtain, by the DMS, a second list of one or more second data blocks associated with one or more differences between a third snapshot stored at the second block-based storage environment and a fourth snapshot stored at the second block-based storage environment, wherein the third snapshot is representative of the computing object as of a third point in time and the fourth snapshot is representative of the computing object as of the first point in time;

merge, by the DMS, the first list of one or more first data blocks and the second list of one or more second data blocks to obtain a merged list of one or more third data blocks;

generate, by the DMS after merging the first list and the second list and using the merged list of the one or more third data blocks, a fifth snapshot within the second block-based storage environment that is representative of the computing object as of the second point in time, wherein the fifth snapshot is an incremental snapshot that is representative of changes to the computing object relative to the third snapshot based at least in part on the use of the merged list of the one or more third data blocks; and storing, within the second block-based storage environment, the fifth snapshot that is representative of the changes to the computing object relative to the third snapshot.

* * * * *